(12) United States Patent
Nishijima et al.

(10) Patent No.: US 6,263,151 B1
(45) Date of Patent: Jul. 17, 2001

(54) RECORDING/REPRODUCING APPARATUS AND REPRODUCING APPARATUS

(75) Inventors: Hideo Nishijima; Shoji Ohno, both of Hitachinaka; Kouji Minabe, Hitachiota; Katsuyuki Watanabe, Mito, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/090,339

(22) Filed: Jun. 4, 1998

(30) Foreign Application Priority Data

Jun. 5, 1997 (JP) .................................................. 9-147712

(51) Int. Cl.[7] .................................................. H04N 5/91
(52) U.S. Cl. .................. 386/68; 386/46; 386/81; 386/112; 360/64
(58) Field of Search .................. 386/1, 6–8, 23, 386/35, 37, 39, 40, 46, 67–68, 74, 81, 96, 98, 123, 124, 112, 116, 122; 360/62, 64

(56) References Cited

U.S. PATENT DOCUMENTS

| | | | |
|---|---|---|---|
| 5,481,414 | * | 1/1996 | Takada et al. .................. 386/112 |
| 5,493,456 | | 2/1996 | Augenbraun et al. . |
| 5,937,135 | * | 8/1999 | Kim et al. .................. 386/46 |
| 6,081,649 | * | 6/2000 | Asamura et al. .................. 386/81 |

FOREIGN PATENT DOCUMENTS

| | | |
|---|---|---|
| 0 581 307 A2 | 2/1994 | (EP) . |
| 0 718 825 A1 | 6/1996 | (EP) . |
| 4-069809 | 3/1992 | (JP) . |
| 4-170701 | 6/1992 | (JP) . |
| 7-073405 | 3/1995 | (JP) . |
| WO 96/06426 | 2/1996 | (WO) . |

* cited by examiner

Primary Examiner—Wendy R. Garber
Assistant Examiner—Christopher Onuaku
(74) Attorney, Agent, or Firm—Antonelli, Terry, Stout & Kraus, LLP

(57) ABSTRACT

In a recording/reproducing apparatus and a reproducing apparatus based on a helical scan system for recording or reproducing a video signal and an audio signal on or from a magnetic tape by use of a magnetic head assembly mounted on a rotary drum, the recording/reproduction of an audio signal in both a standard play mode with a tape speed equal to a standard speed and a long play mode or N-ple play mode with a tape speed N times (N: an integer not smaller than 4) as high as the standard speed is performed by a common audio head. At the time of reproduction in the N-ple play mode, the optimum tracking control is performed by a tracking control system by use of an output of the audio head. At the time of completion of recording in the N-ple play mode, a video signal is supplied with a time prolonged corresponding to the delay of scan of a video head from that of the audio head so that a video track is surely overwritten on an audio track. A high-speed fast feed/rewind speed at the time of N-ple play mode is set to a low value as compared with the tape speed at the time of standard play mode, thereby ensuring the detection of an index signal from the magnetic tape in the N-ple play mode.

31 Claims, 15 Drawing Sheets

RECORDING/REPRODUCING APPARATUS AND REPRODUCING APPARATUS

BACKGROUND OF THE INVENTION

The present invention relates to a system construction and so on for realizing a long play recording/reproducing system such as a recording/reproducing apparatus and a reproducing apparatus.

Conventionally, for example, in VHS standard magnetic recording/reproducing apparatuses or video tape recorders (VTR), there has been realized a long play recording mode of a triple mode in which a magnetic tape runs at a speed equal to ⅓ of a standard tape running speed. These techniques have been disclosed by, for example, JP-A-59-124004 and so on. Also, various data input means using a control signal on a magnetic tape include techniques disclosed by, for example, JP-A-62-33388 and so on. Further, high-speed fast feed/rewind techniques have been disclosed by, for example, JP-A-1-217752.

SUMMARY OF THE INVENTION

There are very strong demands for long play recording and longer play recording apparatuses are desired. However, it is necessary to realize a reasonable system while maintaining the compatibility with the conventional standard play recording mode. Therefore, an object of the present invention is to realize a long play recording mode while following the conventional system while solving problems inclusive of the construction of rotary audio and video heads, a control method for automatic tracking and a control technique at the time of high-speed fast feed/rewind which newly arise in realizing the long play mode.

To attain the above object, the present invention provides a recording/reproducing apparatus of a helical scan system for recording a video signal and an audio signal in a superimposed manner on a magnetic tape by use of magnetic head means mounted on a rotary body or reproducing such recorded signals by use of the magnetic head means, characterized in that the magnetic head means includes first and second video heads for recording or reproducing a video signal at the time of standard play mode in which the running speed of the magnetic tape is a standard speed, third and fourth video heads for recording or reproducing a video signal at the time of N-ple play mode in which the tape running speed is approximately 1/N of the standard speed wherein N is an integer not smaller than 4, and first and second audio heads for recording or reproducing an audio signal, the video and audio heads being provided on the outer periphery of the rotary body, that the first and second video heads, the third and fourth video heads, and the first and second audio heads are respectively provided in pairs so that the heads in each pair are arranged at positions which are substantially symmetrical with respect to a rotation axis of the rotary body, the gap planes of the paired heads being tilted relative to a plane perpendicular to a head rotation direction by equal angles in different directions, and the tilt angles of the first and second audio heads being different from the tilt angles of the first and second video heads and the third and fourth video heads, and that the recording is performed so that the first and second video heads or the third and fourth video heads record a video signal in a superimposed manner on a track having an audio signal recorded on the magnetic tape by the first and second audio heads.

Also, it is characterized in that the first and fourth video heads having their gap planes with different titling directions are arranged in proximity to each other to form one pair while the second and third video heads having their gap planes with different titling directions are arranged in proximity to each other to form one pair, these pairs being respectively arranged rearward of the arranging positions of said first and second audio heads by approximately 120 degree along the head rotation direction so that the heights of the centers of the head widths of these video heads measured from a reference surface of the body substantially coincide with each other.

In this case, it is preferable that the head width of each of the first and second audio heads is not larger than three times as large as a track pitch formed on the magnetic tape at the time of N-ple play mode. There can be provided automatic tracking means for performing a tracking control by use of a signal reproduced by the first and second audio heads when a magnetic tape subjected to recording in N-ple play mode. The head width of each of the third and fourth video heads is approximately two times as large as a track pitch formed on the magnetic tape at the time of N-ple play mode.

Also, it is preferable that the heights of arrangement of the third and fourth video heads and the first and second audio heads relative to a reference surface of the rotary body are set to positions with which at the time of N-ple play mode, the third and fourth video heads scan the magnetic tape in a manner delayed from the first and second audio heads by four or more tracks. Further, it is preferable that at the time of completion of recording, the stop of supply of an audio recording signal to the first and second audio heads is followed by the supply of a video recording signal to the third and fourth video heads with a time prolonged corresponding to the delay of scan of the magnetic tape by the third and fourth video heads from that by the first and second audio heads.

Further, the recording/reproducing apparatus of the present invention is characterized in that first and second video heads for recording or reproducing a video signal at the time of standard play mode in which the running speed of the magnetic tape is a standard speed, third and fourth video heads for recording or reproducing a video signal at the time of triple play mode in which the tape running speed is approximately ⅓ of the standard speed, and first and second audio heads for recording or reproducing an audio signal are provided as the magnetic head means on the outer periphery of the rotary body, and that at the time of N-ple play mode in which the tape running speed is approximately 1/N of the standard speed wherein N is an integer not smaller than 4, the recording is performed so that the third and fourth video heads record a video signal in a super-imposed manner on a track having an audio signal recorded on the magnetic tape by the first and second audio heads. In this case, the head width of each of the third and fourth video heads recording or reproducing a video signal at the time of triple play mode and at the time of N-ple play mode is substantially equal to a track pitch at the time of triple play mode.

Further, the recording/reproducing apparatus of the present invention is characterized by comprising first and second video heads for alternately forming recording tracks on a recording medium, delay means for delaying at least one of video recording signals supplied to the first and second video heads, and delay control means for controlling a delay time of the delay means substantially for each recording track, the delay control means making a control so that horizontal synchronizing signals recorded on the recording medium are arranged between adjacent recording tracks.

Further, the recording/reproducing apparatus of the present invention is characterized by comprising means for making the switching between a first recording/reproducing mode in which the recording/reproducing is performed with the recording medium being run at a first running speed and with the rotary body being rotated at a first rotating speed, a second recording/reproducing mode in which the recording/reproducing is performed with the recording medium being run at a second running speed and with the rotary body being rotated at said first rotating speed, and a third recording/reproducing mode in which the recording/reproducing is performed with the recording medium being run at a third running speed and with the rotary body being rotated at a second rotating speed. In this case, it is preferable that the second running speed is 1/N of the first running speed wherein N is an integer not smaller than 2, the third running speed is 1/M of the second running speed wherein M is an integer not smaller than 2, and the second rotating speed is 1/M of the first rotating speed wherein M is an integer not smaller than 2.

Further, the recording/reproducing apparatus of the present invention is characterized by comprising means for making the switching between a first recording mode in which a video signal corresponding to one field is recorded on one recording track and a second recording mode in which a video signal corresponding to M fields is recorded on one recording track wherein M is an integer not smaller than 2.

Also, the present invention provides a reproducing apparatus of a helical scan system for reproducing a video signal and an audio signal by use of magnetic head means mounted on a rotary body, the video signal and the audio signal being recorded in a super-imposed manner on a magnetic tape, characterized in that the magnetic head means includes first, second, third and fourth video heads and first and second audio heads, and that there is provided means for making the switching between a standard play reproducing mode for causing the first and second video heads and the first and second audio heads to reproduce a video signal and an audio signal recorded in a standard play mode in which the running speed of the magnetic tape is a standard speed, a triple play reproducing mode for causing the third and fourth video heads and the first and second audio heads to reproduce a video signal and an audio signal recorded in a triple play mode in which the tape running speed is approximately ⅓ of the standard speed, and a N-ple play reproducing mode for causing the third and fourth video heads and the first and second audio heads to reproduce a video signal and an audio signal recorded in an N-ple play mode in which the tape running speed is approximately 1/N of the standard speed wherein N is an integer not smaller than 4. It is further characterized in that there is included a double play reproducing mode for causing the first and second video heads and the first and second audio heads to reproduce a video signal and an audio signal recorded in a double play mode in which the tape running speed is approximately ½ of the standard speed.

Also, the reproducing apparatus of the present invention is characterized by comprising speed setting means by which a tape running speed when a magnetic tape subjected to recording in an N-ple play mode with a tape running speed equal to approximately 1/N (N: an integer not smaller than 4) of a standard speed is subjected to high-speed fast feed or rewind is set to be lower than a tape running speed when a magnetic tape subjected to recording in a standard play mode with a tape running speed equal to the standard speed is subjected to high-speed fast feed or rewind. In this case, it is desirable that the speed is set so that it falls within a speed range in which a control signal reproduced from the magnetic tape is detectable, preferably, for example, a speed range in which the duty of a control signal reproduced from the magnetic tape can be discriminated.

In the recording/reproducing apparatus and the reproducing apparatus mentioned above, it is preferable that the value of N is 5 or 6. Further, thereby making it possible to set the value of N by arbitrarily selecting an integer not smaller than 4 from among a plurality of values.

Also, it is preferable that the recording/reproducing apparatus or the reproducing apparatus is a video tape recorder based on a VHS system. These apparatuses is provided with medium detecting means for detecting the type of the recording medium, whereby the running speed of the recording medium and the rotating speed of the rotary body can be set or selected in accordance with the result of having detected the kind of the medium.

BRIEF DESCRIPTION OF THE DRAWINGS

These and other features, objects and advantages of the present invention will become more apparent from the following description when taken in conjunction with the accompanying drawings.

DETAILED DESCRIPTION OF THE PREFERRED EMBODIMENTS

Embodiments of the present invention will now be described in detail on the basis of the accompanying drawings.

Figure 1:
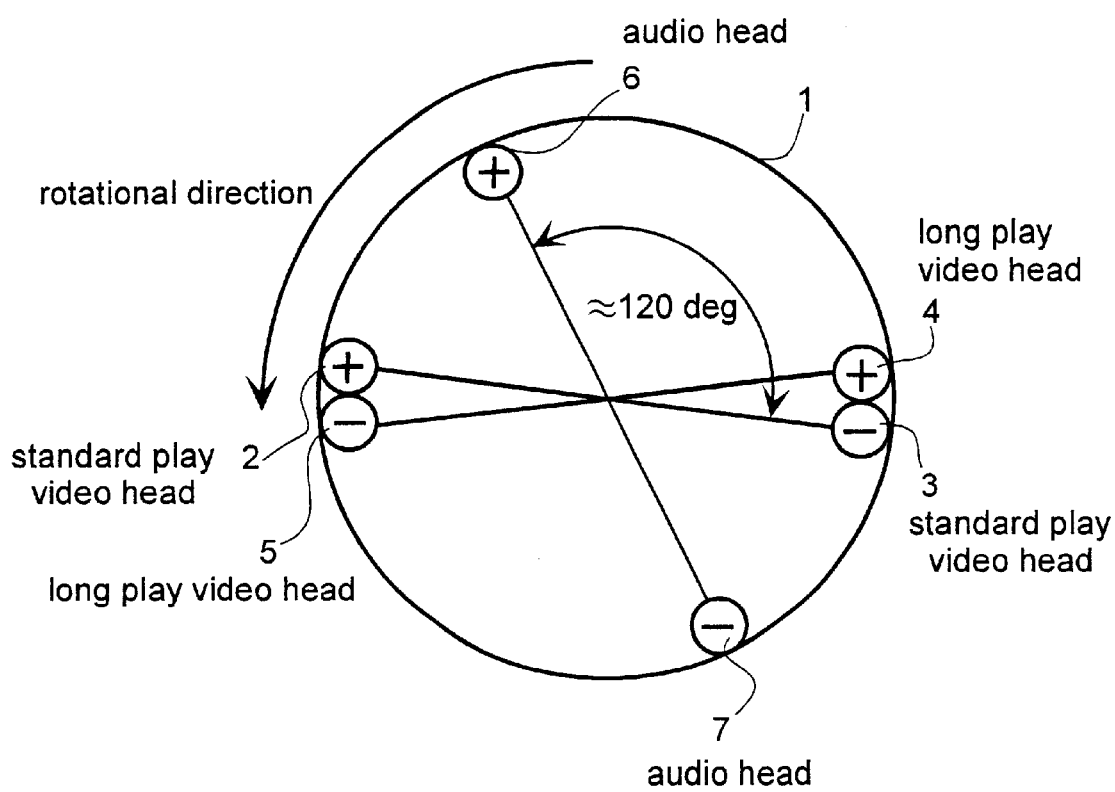
FIG. 1 is a diagram showing an embodiment of the head construction of a magnetic recording/reproducing apparatus according to the present invention.
Figure 2:
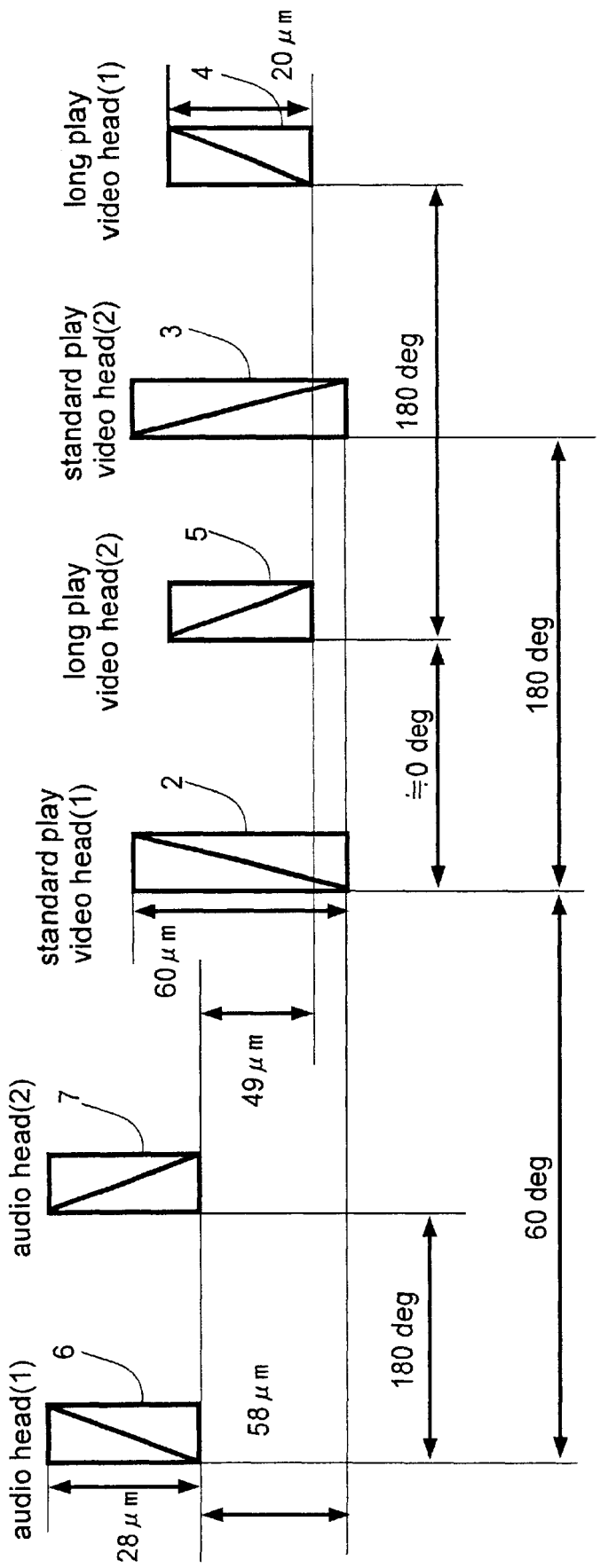
FIG. 2 is a diagram showing the arrangement of heads shown in FIG. 1.
Figure 3:
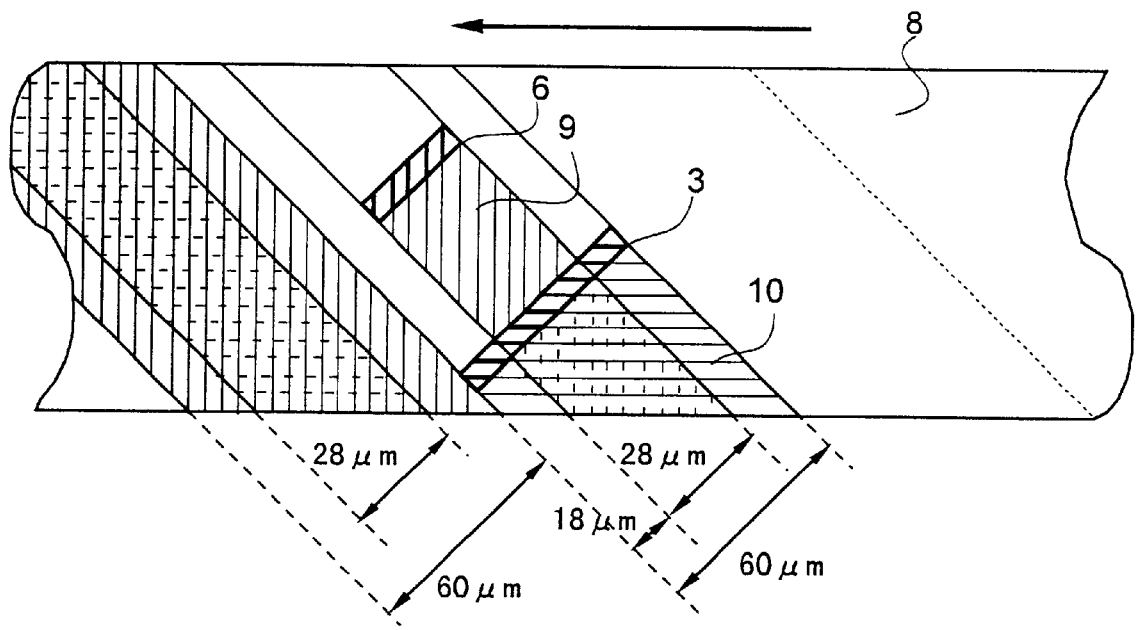
FIG. 3 is a pattern diagram showing a relative positional relationship between a tape and heads at the time of recording in a standard play mode.
Figure 4:
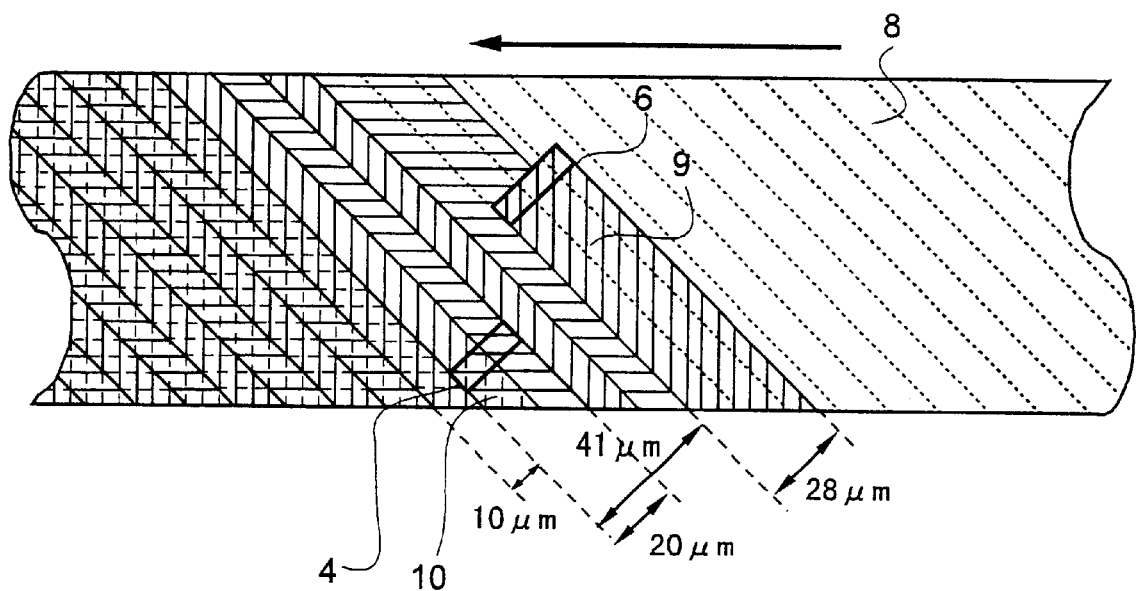
FIG. 4 is a pattern diagram showing a relative positional relationship between a tape and heads in a sextuple play mode to which the present invention is applied.

First, a first embodiment of the present invention will be described using FIGS. 1 to 4. FIG. 1 is a diagram showing the construction of heads on a drum according to the first embodiment. FIG. 2 is a diagram showing level differences between the heads in a head attachment height direction. FIG. 3 is a pattern diagram showing a relative positional relationship between a tape and heads in a standard play recording mode. FIG. 4 is a pattern diagram showing a relative positional relationship between a tape and heads in a sextuple play mode.

In FIGS. 1 and 2, reference numeral 1 denotes a rotary drum, numerals 2 and 3 standard play video recording/reproducing heads, numerals 4 and 5 sextuple play video recording/reproducing heads, and numerals 6 and 7 audio recording/reproducing heads.

The pair of video heads 2 and 3 for standard play mode and the pair of video heads 4 and 6 for sextuple play mode are arranged on the rotary drum 1 so that the paired heads have the interval of about 180 degree therebetween and their different azimuth angles. Similarly, the pair of audio heads 6 and 7 are arranged so that they have the interval of about 180 degree therebetween and their different azimuth angles. The video heads 2 and 5 are arranged substantially in proximity to each other. The same holds for the video heads 3 and 4. An interval between those heads is set to be N times as long as a horizontal synchronizing signal period, wherein N is usually 1 or 2. The audio head 6 (or 7) and the video heads 3 and 4 (or 2 and 5) are arranged with an interval of 120 degree required therebetween. It is assumed that the rotating direction of the rotary drum 1 is anticlockwise, as is indicated by arrow. An example of an azimuth angle of each head formed between a gap plane of the head and a plane perpendicular to the rotating direction of the head is such that the video heads 2 and 4 have about +6 degree, the video heads 3 and 5 have about −6 degree, the audio head 6 has about +30 degree, and the audio head 7 has about −30 degree. Thereby, an azimuth loss is utilized to reduce a crosstalk between audio and video signals caused between adjacent tracks and in the same tracks.

The attaching levels or heights and the head widths of the video heads 2 to 5 and the audio heads 6 and 7 are as shown in FIG. 2.

FIGS. 3 and 4 show recording track patterns when the recording is made on a magnetic tape by the head construction as mentioned above. In FIGS. 3 and 4, the same portions or components as those in FIGS. 1 and 2 are denoted by the same reference numerals as those used in FIGS. 1 and 2. Reference numeral 8 denotes a magnetic tape, numeral 9 an audio track, and numeral 10 a video track.

First, a relative positional relationship between the magnetic tape 8 and the heads 3 and 6 in a standard play recording mode is shown in FIG. 3. The tape speed is controlled so that each track pitch is about 60 $\mu$m. The head width of the audio head 6 is on the order of about 28 $\mu$m with which an audio track 9 is formed on the magnetic tape 8. Delayed behind the audio head 6 by 120 degree on the rotary drum 1, the standard play video head 3 forms a video track 10 in such a manner that it is overwritten on the audio track 9. The delay of 120 degree on the rotary drum 1 corresponds to the running of the magnetic tape equal to (120 degree)/(180 degree) of the track pitch (about 60 $\mu$m). In order that the overwriting is performed taking the tape running of 40 $\mu$m (=60 $\mu$m×120/180) plus a into consideration, a level difference between the heads 3 and 6 is selected to be about 58 $\mu$m. Plus a is a value for setting the audio track 9 so that it is substantially positioned at the vicinity of the center of the video track 10, as shown in FIG. 3. Thereby, the overlapping of different azimuth polarity portions of the audio track 9 and the video track 10 spans about 28 $\mu$m. Also, it can be said that a proper head width for the video head 3 is about 60 $\mu$m which corresponds to the track pitch width. Generally, an audio signal is recorded down to a deep layer portion of the magnetic tape 8 as a modulating signal with a relatively low frequency, and a video signal is recorded in a surface portion of the magnetic tape 8 as a modulating signal with a relatively high frequency in a manner overwritten on the modulating signal of the audio signal while erasing of the same.

Next, a recording operation in a sextuple play mode will be described referring to FIG. 4 in connection with a relative positional relationship between the magnetic tape 8 and the heads 4 and 6 in the sextuple play mode. The tape speed is controlled so that each track pitch is about 10 $\mu$m. The head width of the audio head 6 is on the order of about 28 $\mu$m with which an audio track 9 is formed on the magnetic tape 8, as mentioned above. Delayed behind the audio head 6 by 120 degree on the rotary drum 1, the sextuple play video head 4 forms a video track 10 in such a manner that it is overwritten on the audio track 9. The delay of 120 degree on the rotary drum 1 corresponds to the running of the magnetic tape equal to (120 degree)/(180 degree) of the track pitch (about 10 $\mu$m). Though there is a concept of selecting a level difference between the heads 4 and 6 to be about 7 $\mu$m with the tape running of about 7 $\mu$m (=10 $\mu$m×120/180) being taken into consideration, the level difference selected in the shown example is about 49 $\mu$m for a reason which will be mentioned later on. Thereby, the overlapping of the same azimuth polarity portions of the audio track 9 and the video track 10 spans about 8 $\mu$m. However, since the azimuth angles of the video and audio heads 4 and 6 are different or 6 degree and 30 degree, respectively, as mentioned above, a sufficient azimuth loss is obtained so that an interference between video and audio signals is sufficiently removed. Also, it can be said that a proper head width for the video head 4 is about 20 μm which is sufficiently wide as compared with the track pitch width. This aims at the acquisition of a sufficient tracking performance even for the bend of the track or the like.

Figure 5:
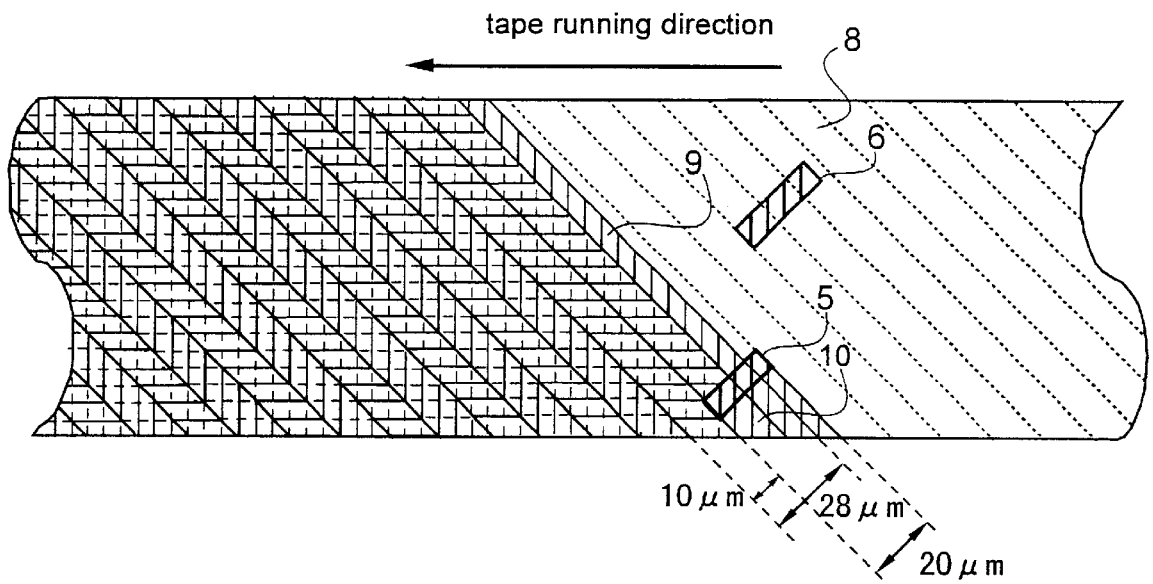
FIG. 5 is a diagram showing the relative positional relationship representing the recording stop timings of a video head and an audio head at the time of stop of recording in the sextuple play mode to which the present invention is applied.
Figure 6:
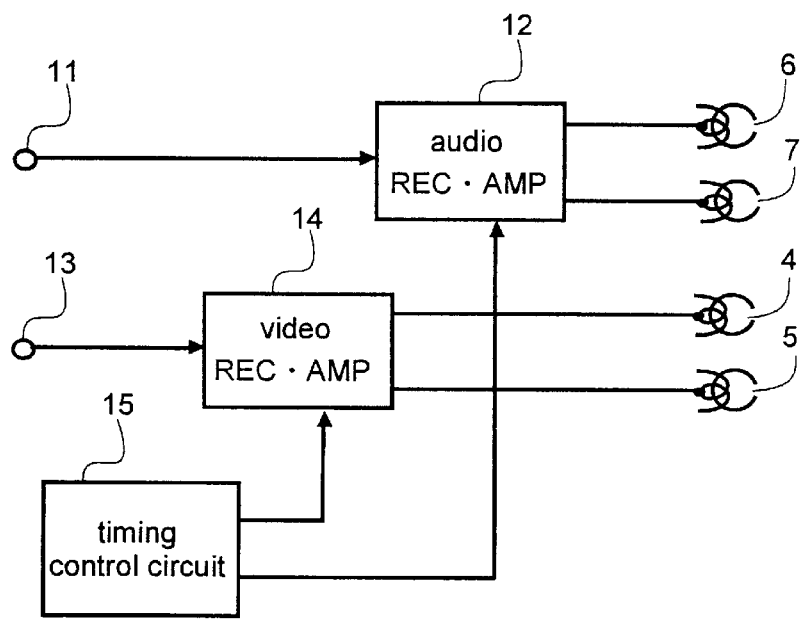
FIG. 6 is a circuit block diagram for realizing the relationship shown in FIG. 5.

Next, a control of a recording completion point at the time of recording in such a sextuple play mode will be described in detail by use of FIGS. 5 and 6. In FIGS. 5 and 6, the same portions or components as those in FIGS. 1 to 4 are denoted by the same reference numerals as those used in FIGS. 1 to 4. Reference numeral 11 denotes an audio recording signal input terminal, numeral 12 an audio recording amplifier, numeral 13 a video recording signal input terminal, numeral 14 a video recording amplifier, and numeral 15 a timing control circuit for generation of mute signals to the recording amplifiers 12 and 14.

At the time of completion of recording, the audio recording/reproducing heads 6 and 7 precede. Therefore, if the supply of a recording signal to the audio recording/reproducing heads 6 and 7 and the supply of a recording signal to the video recording/reproducing heads 4 and 5 are simultaneously stopped, there is left an area where only an audio signal is recorded. Accordingly, it is required to take a construction in which the supply of a recording signal to the video recording/reproducing heads 4 and 5 are continued by at least a time when the video recording/reproducing heads 4 and 5 certainly perform the overwriting on an audio track 9 recorded by the audio recording/reproducing heads 6 and 7. Namely, as shown in FIG. 6, an audio signal inputted from the audio recording signal input terminal 11 is supplied through the audio recording amplifier 12 to the audio recording/reproducing heads 6 and 7 while a video signal inputted from the video recording signal input terminal 13 is supplied through the video recording amplifier 14 to the video recording/reproducing heads 4 and 5, and the timings of stop of the supply of the recording signals from the audio and video recording amplifiers 12 and 14 to the heads 6 and 7 and the heads 4 and 5 are controlled by mute signals supplied from the timing control circuit 15. In FIG. 5, the mute signal to the video recording amplifier 14 is generated at a timing delayed from the supply of the mute signal to the audio recording amplifier 12 by (5+120/180) tracks, that is, (5+120/180) fields (or about 94.4 ms) so that the succeeding video recording/reproducing head 5 (and 4) can completely perform the overwriting for the preceding audio recording/reproducing head 6 (and 7).

Figure 18:
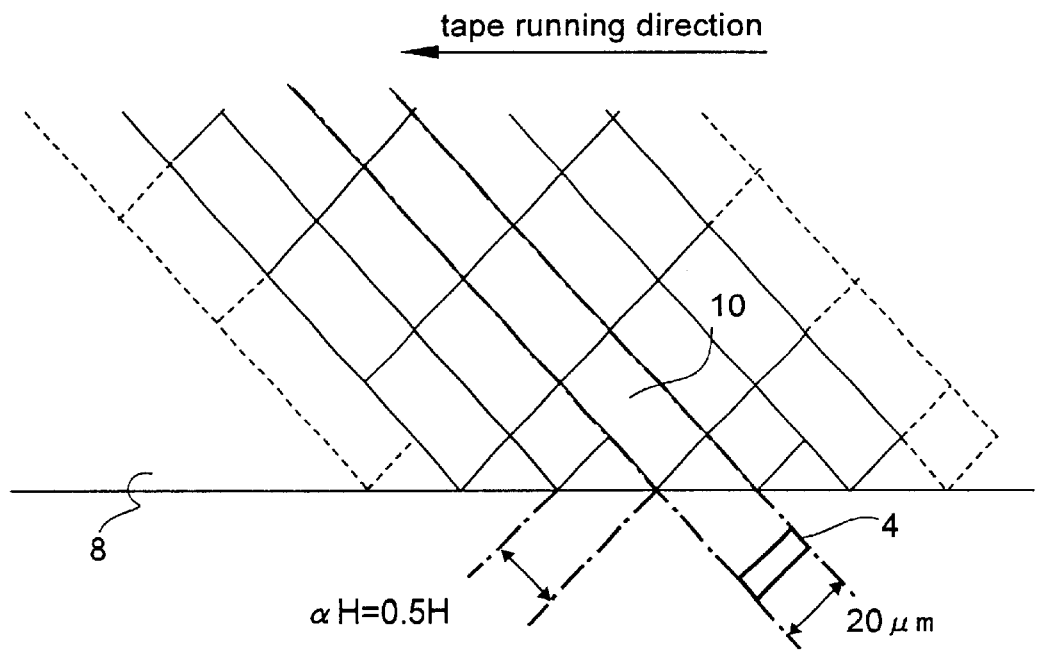
FIG. 18 is a pattern diagram showing the details of FIG. 13 in an enlarged form.
Figure 19:
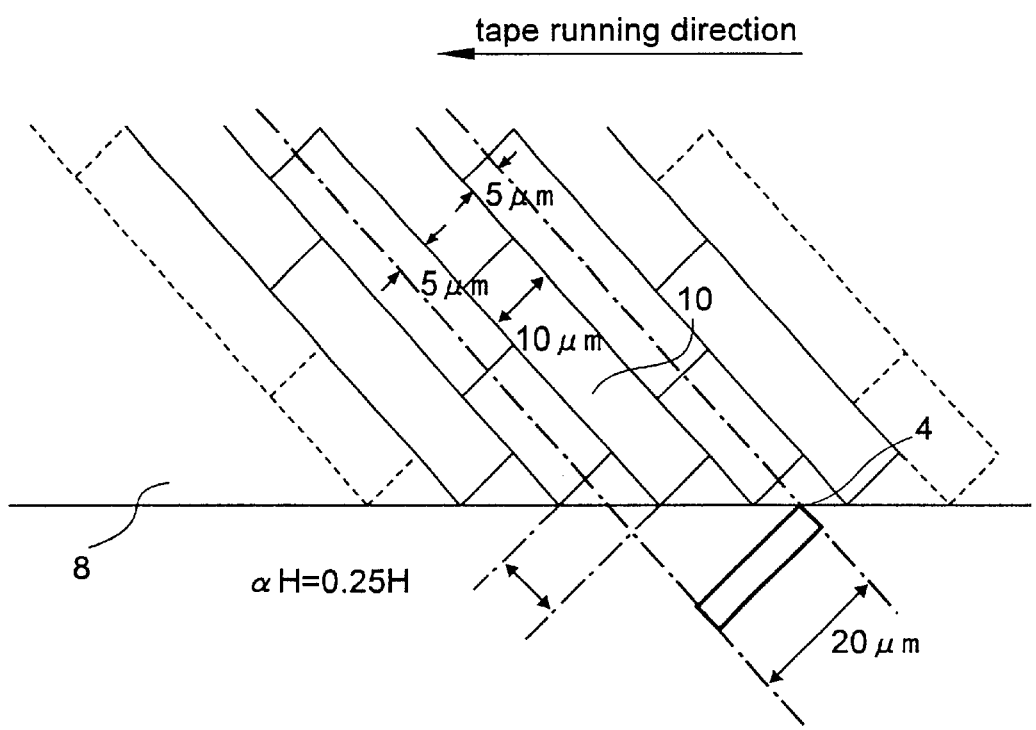
FIG. 19 is a pattern diagram showing the details of FIG. 7 in an enlarged form.

Next, the arrangement of horizontal synchronizing signals on the magnetic tape thus subjected to the recording is shown in FIG. 18 in conjunction with a triple play mode and in FIG. 19 in conjunction with a sextuple play mode with a VHS standard system being taken as an example. According to the VHS standard, the deviation number (αH) of horizontal synchronizing signals (H) between adjacent tracks at the time of recording in the triple play mode is set to 0.5 H, as shown in FIG. 18. Therefore, when one field (262.5H) is recorded on one track, the horizontal synchronizing signals (H) ensures an orderly H arrangement between adjacent recording tracks.

Figure 20:
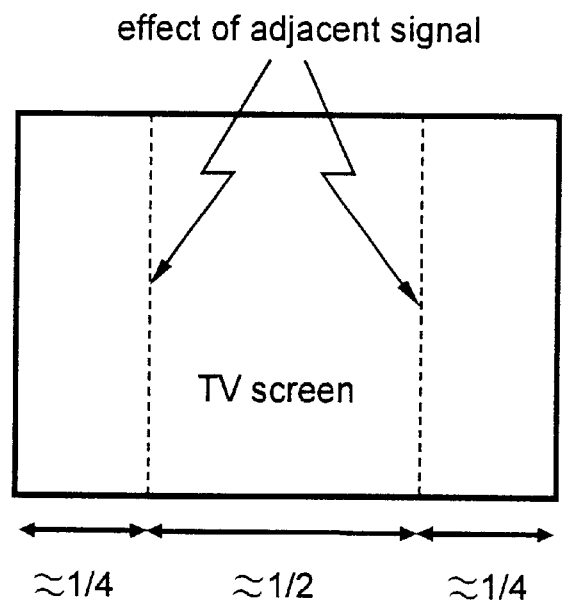
FIG. 20 is an image diagram showing an example of display of a video signal reproduced by the construction shown in FIG. 19.

However, in the example of the sextuple play mode to which the present invention is applied, as shown in FIG. 19, the deviation number αH is 0.25H so that the horizontal synchronizing signals (H) takes a disturbed H arrangement between recording tracks. When the magnetic tape subjected to such recording is subjected to reproduction by the head 4 which is wider in width than the recording track shown in FIG. 19, the problem of leakage of signals from opposite adjacent tracks is liable to arise. In substance, though adjacent tracks are subjected to recording by heads having different azimuth angles so that an adjacent component is reproduced with a level considerably lowered by virtue of an azimuth effect, for example, a horizontal synchronizing signal portion of relatively low frequency component in a low band converted chrominance signal or luminance signal incapable of enjoying the azimuth effect especially leaks to give bad influence on the image quality. A monitored image at this time is shown in FIG. 20. Since horizontal synchronizing signal portions leaking from the opposite adjacent tracks deviate by 0.25H right and left respectively, as shown in FIG. 19, they appear as adjacent interfering signals in the form of two longitudinal stripes on the screen, as shown in FIG. 20, thereby deteriorating the image quality.

Figure 21:
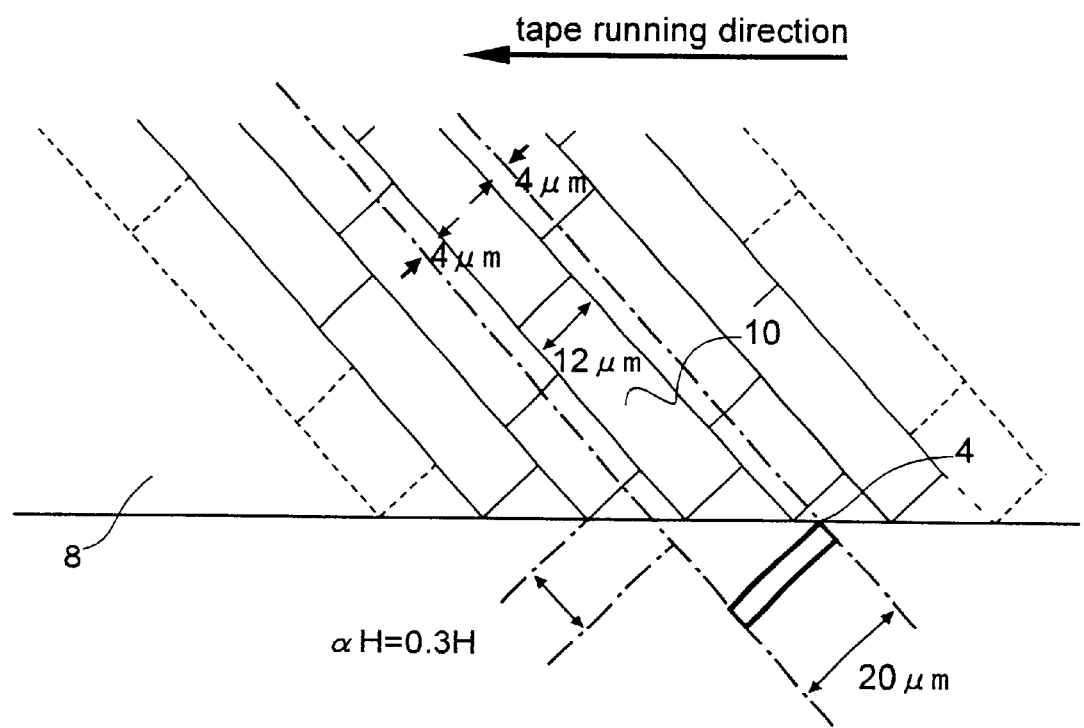
FIG. 21 is a detailed relative positional relationship showing a relationship in tracking phase between a tape and heads at the time of reproduction of a pattern recorded in a quintuple play mode to which the present invention is applied.

An example of measures to counter the above-mentioned effect from the opposite adjacent tracks is shown in FIG. 21 in conjunction with a quintuple play mode. With the recording in the quintuple play mode, the effect from the opposite adjacent tracks is greatly reduced as compared with that in the sextuple play mode. Namely, the detection at the time of sextuple play mode is the detection of 5 μm from opposite adjacent tracks for 10 μm of a main track (ratio: 5/10=0.5) whereas the detection at the time of quintuple play mode is the detection of 4 μm from opposite adjacent tracks for 12 μm of a main track (ratio: 4/12=0.33). The foregoing description is made in connection with the example in which the tracking control is performed so that the detection is made equally from the right and left adjacent tracks. In substance, however, it can be said that to perform the reproduction while maintaining the same positional relationship as that at the time of recording enables the complete satisfaction of the same condition as that at the time of recording and can cope with mechanical disturbing factors. Even in such a case, in the sextuple play mode, since the head end adjoins the same azimuth angle track which is the nearest but one adjacent track, there can be considered the nearest but one adjacent signal interference which results in the further deterioration of the image quality. From this point of view, too, the quintuple play mode is more effective. Further, it is needless to say that a plurality of longer play modes (for example, quintuple and sextuple play modes described in conjunction with the present embodiment) than the conventional triple play mode can be used in such a manner that they are switched, as required.

Figure 22:
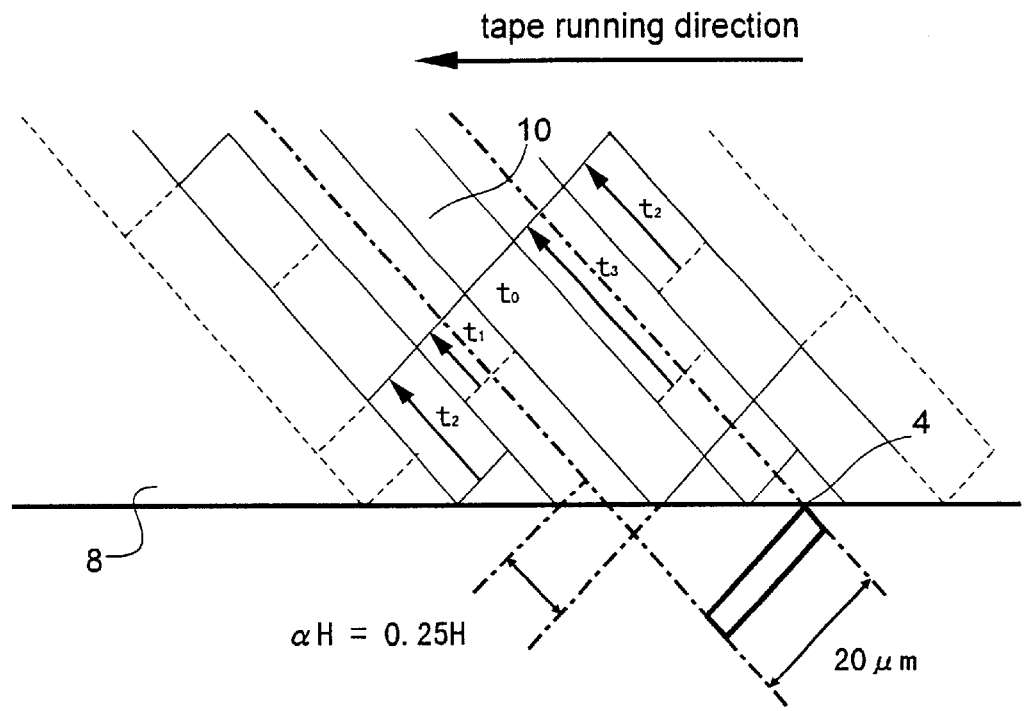
FIG. 22 is a pattern diagram in an improved version of the pattern shown in FIG. 19.
Figure 23:
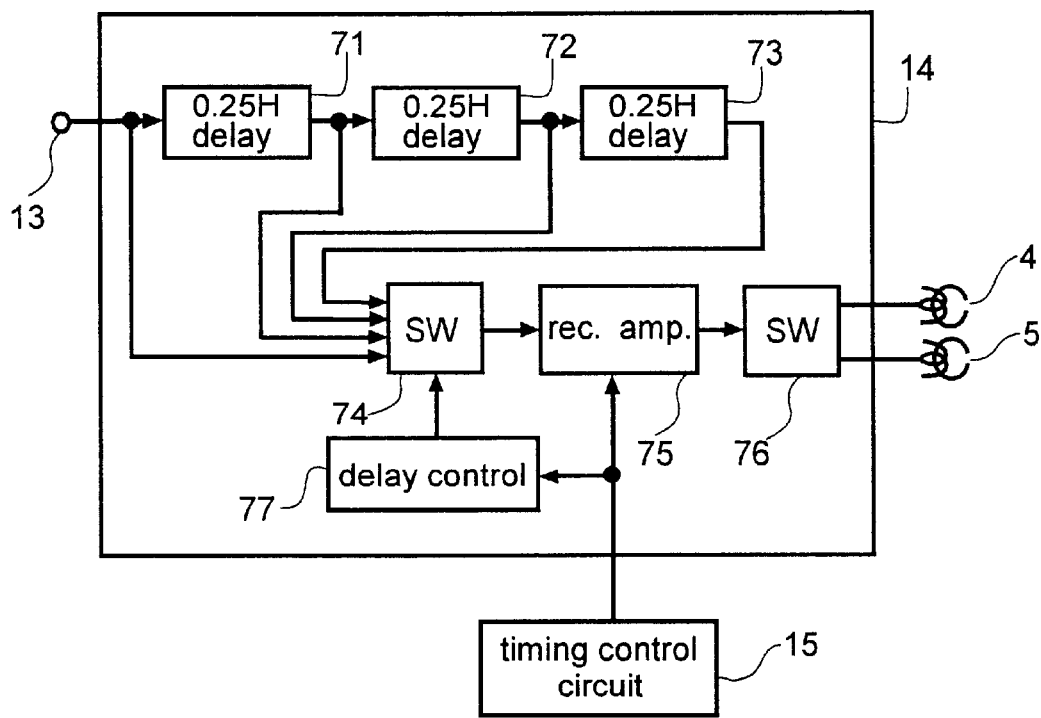
FIG. 23 is a circuit diagram showing a detailed example of the circuit of FIG. 6 for realizing the relationship shown in FIG. 22.

As a positive solving measure, FIGS. 22 and 23 show an H arrangement realizing measure at the time of recording in the sextuple play mode. FIG. 23 shows an example of the specific circuit construction of the video recording amplifier 14 shown in FIG. 4. In FIG. 23, reference numerals 71 to 73 denote 0.25H delay circuits, numeral 74 a switching (SW) circuit, numeral 75 a recording amplifier, numeral 76 a switching (SW) circuit, and numeral 77 a delay control circuit. With this circuit construction, the H arrangement on each recording track can be ensured by switching the delay time in units of 0.25H for every recording track, as shown in FIG. 22. Namely, the H arrangement on all recording tracks can be realized by repeating four modes inclusive of t2=0.5H, t1=0.25H, t0=0H and t3=0.75H for each recording track. Though the sextuple play mode has been described in conjunction with the present embodiment, it is needless to say that there is no limitation to such an example or the similar is possible for the quintuple play mode.

With the above construction, the positions of interfering signals from the nearest adjacent track and the nearest but one adjacent track assume the substantially same positions as horizontal synchronizing signals which do not appear on the monitor screen. The control for this purpose can be realized by supplying an output pattern of the above-mentioned four modes from the delay control circuit 77 of FIG. 23 in the video recording amplifier 14 to the SW circuit 74 in accordance with a signal from the timing control circuit 15 so that the optimum signal(s) is selected from the inputs/outputs of the 0.25H delay circuits 71 to 73 and is then supplied to the heads 4 and 5 through the recording amplifier 75 and the SW circuit 76. Thereby, the recording with the H arrangement as shown in FIG. 22 can be made on the magnetic tape.

Figure 7:
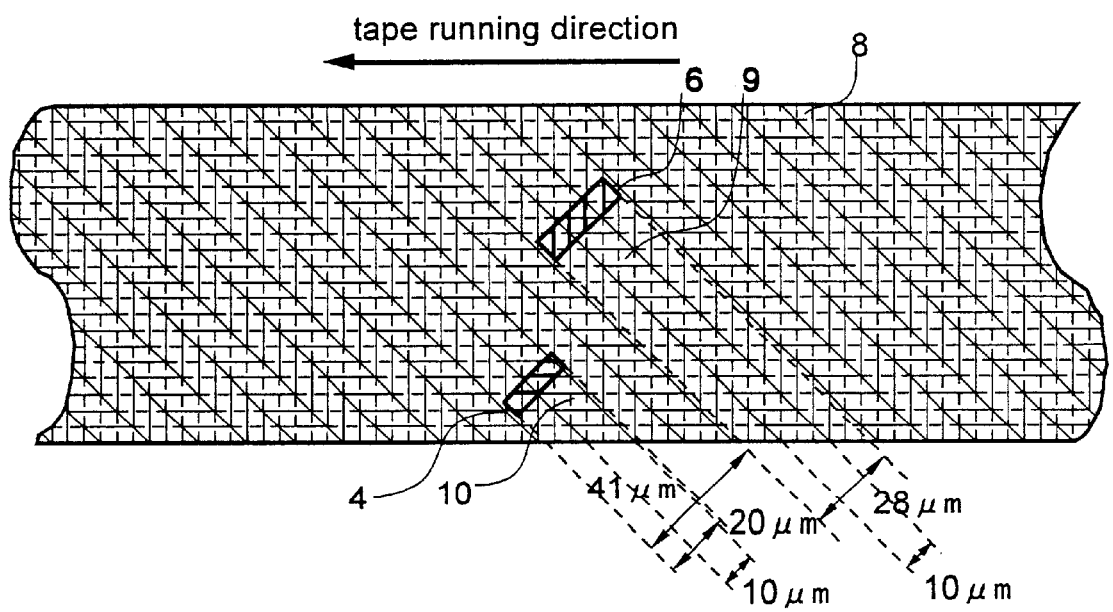
FIG. 7 is a diagram showing a relative positional relationship representing a relationship in tracking phase between a tape and heads at the time of reproduction in the sextuple play mode to which the present invention is applied.

Next, a reproducing operation in reproducing the signal thus recorded in the sextuple play mode will be described referring to FIG. 7 in connection with a relative positional relationship between the magnetic tape 8 and the heads 4 and 6. Though the basic relative relationship at the time of reproduction is similar to that at the time of recording, the phases of the tape and the head are matched with each other, as shown in FIG. 7, in order to obtain the optimum tracking. Namely, the matching of tracking for the audio head 6 is made so that a desired audio track 9 is substantially positioned at the center of the head 6. Thereby, the audio head makes the scanning on the nearest adjacent audio tracks on opposite sides but it does not make the scanning on the nearest but one adjacent tracks which have the same azimuth as the desired track. Therefore, the head width of the audio head 6 (and 7) is set to be smaller than three times the track pitch width in the sextuple play mode (or audio head width 28 $\mu$m<track pitch 10 $\mu$m×3). With this construction, it is possible to sufficiently attenuate signals from the nearest adjacent tracks by virtue of azimuth loss and to prevent the nearest but one adjacent tracks from being subjected to reproduction, thereby enabling the reproduction of an audio signal for which a sufficient S/N is ensured. Since the audio head 6 is also used in a standard play mode, it is obvious that the possession of a head width as large as possible in the above-mentioned range is advantageous for the improvement in S/N ratio in the standard play mode.

Regarding the width of the video head 4 (and 5) too, it is preferable that considering the reproduction of a tape subjected to recording by another magnetic recording/reproducing apparatus, the head width is set to be sufficiently large in a range smaller than three times the track pitch width, in order that a track bend (±5 $\mu$m) in the magnetic recording/reproducing apparatus in the present embodiment and the other magnetic recording/reproducing apparatus can sufficiently be absorbed. But, to make the head width larger than required results in the deterioration of S/N. Therefore, the proper width is 20 $\mu$m (track width 10 $\mu$m plus track bend 10 $\mu$m) which is enough to cover the track bend and is about two times as large as the track pitch.

Figure 8:
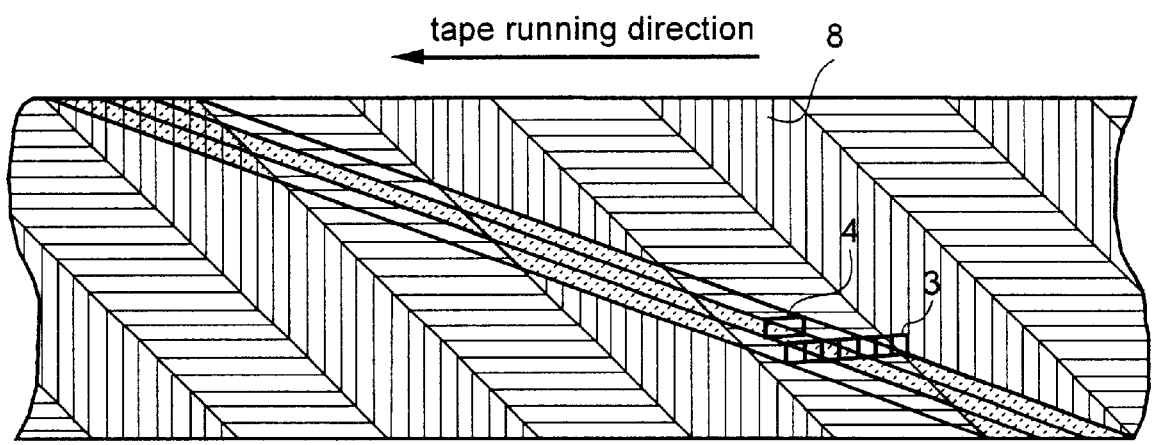
FIG. 8 is a diagram showing a relative positional relationship between a tape and heads at the time of search reproduction in the standard play mode to which the present invention is applied.
Figure 9:
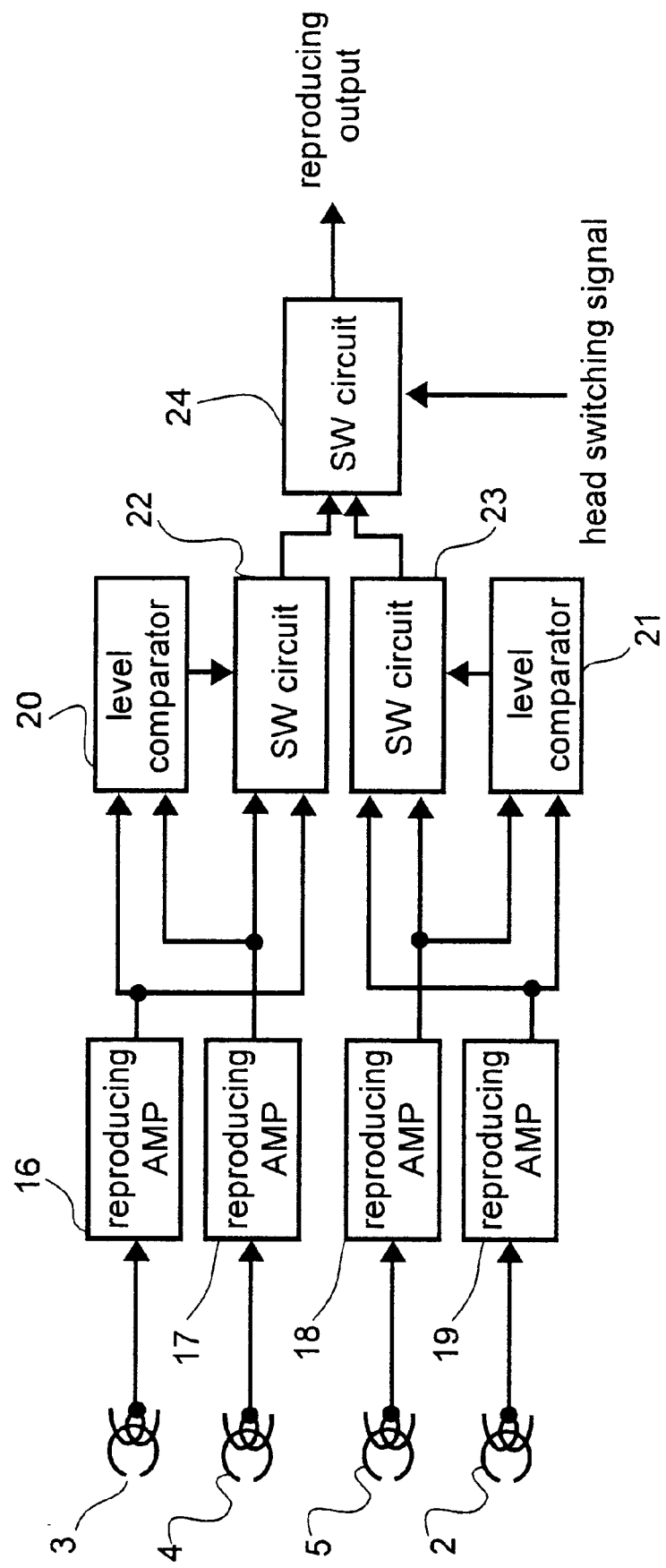
FIG. 9 is a circuit block diagram showing the operation associated with FIG. 8.
Figure 10:
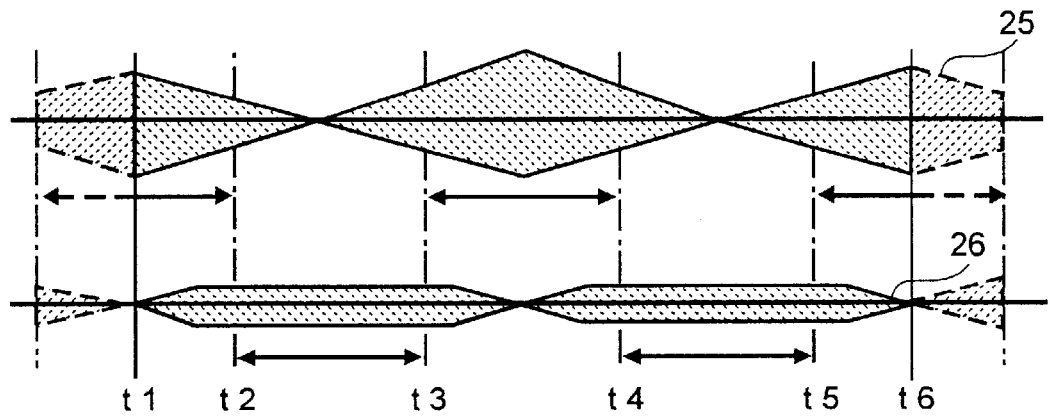
FIGS. 10 to 12 are waveform diagrams showing the operation associated with FIGS. 8 and 9.
Figure 11:
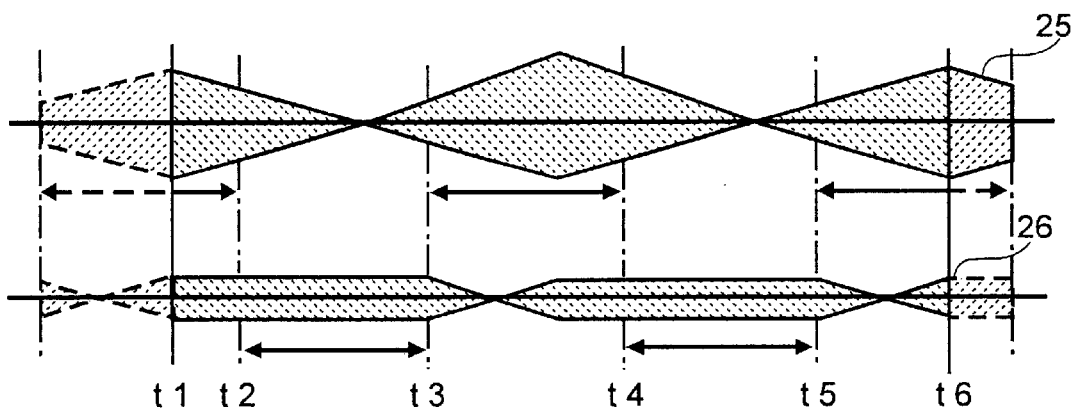
Figure 12:
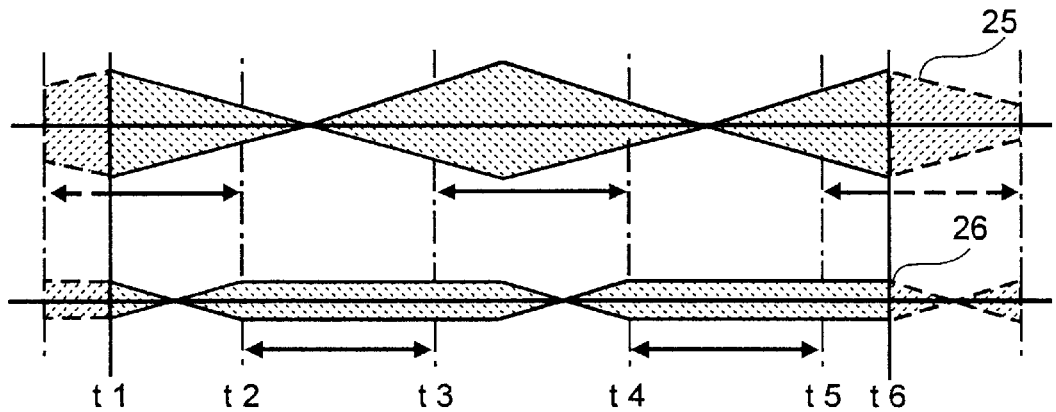

Next, the reason for setting the level difference of the video head 4 (and 5) relative to the audio head 6 (and 7) to about 49 $\mu$m, as mentioned above, will be described using FIGS. 8 and 9. FIG. 8 shows a reproducing operation in connection with a relative positional relationship between the magnetic tape 8 and the heads 3 and 4 when the magnetic tape 8 having been subjected to recording in a standard play mode is subjected to high-speed (in the reverse direction of the tape running direction at the time of recording and about three times as high as the recording speed) reproduction. FIG. 9 shows a circuit block diagram for obtaining the operation shown in FIG. 8. In FIGS. 8 and 9, the same portions or components as those in FIGS. 1 to 7 are denoted by the same reference numerals as those used in FIGS. 1 to 7. Reference numerals 16 to 19 denote reproducing amplifiers, numerals 20 and 21 level comparators, and numerals 22 to 24 switching (SW) circuits. In high-speed reproduction, it is preferable that the video heads 3 and 4 (or 2 and 5) provided adjacent to each other are arranged with different azimuth angles and a level difference between both the video heads is considered such that in the case where the output of the one video head 3 decreases, the output of the other video head 4 increases, as shown in FIGS. 10 to 12. In the figures, reference numeral 25 denotes an output waveform indicating the output level of the video head 3 and numeral 26 denotes an output waveform indicating the output level of the video head 4. By selectively using the larger one of the outputs of both the video heads 3 and 4 (or switching the outputs of both the video heads 3 and 4 at equal intervals), there can be obtained a high-speed reproduction image in which the generation of noises is suppressed. For this purpose, it is preferable that the centers of the head widths of the video heads 3 and 4 are arranged substantially at the same level. The output waveforms 25 and 26 of the video heads 3 and 4 at this time are shown in FIG. 10. Also, considering the relative positional relationship at the time of recording in the sextuple play mode shown in FIG. 4, it is required that the sextuple play video head 4 (or 5) is arranged at a position with which it records succeeding (or delayed behind) the audio head 6 (or 7) by at least four fields (corresponding to four tracks) to six fields (corresponding to six tracks). This is obvious from FIG. 11 showing the output waveforms 25 and 26 of the video heads 3 and 4 at the time of high-speed reproduction in the case where the recording is made succeeding by four fields and FIG. 12 showing the output waveforms 25 and 26 of the video heads 3 and 4 at the time of high-speed reproduction in the case where the recording is made succeeding by six fields. Namely, it is seen that there can be obtained a high-speed reproduction image in which the generation of noises is suppressed. One circuit example for realizing the above is shown in FIG. 9. The outputs of the video recording/reproducing heads 3, 4, 5 and 2 are amplified by the reproducing amplifiers 16, 17, 18 and 19, respectively. The level comparator 20 (or 21) inputted with the output signals of the reproducing amplifiers 16 and 17 (or 18 and 19) amplifying the outputs of the video recording/reproducing heads 3 and 4 (or 5 and 2) arranged in proximity to each other detects the larger one of both the output signals. By selectively switching the switching circuit 22 (or 23) in accordance with the detected output signal, it is possible to select the larger output level always. The outputs of the switching circuits 22 and 23 are selectively switched in the switching circuit 24 by a head switching signal generated in synchronism with the rotation of the drum, thereby making it possible to obtain a continuous reproduction signal.

Instead of making the selection based on only the magnitude of each reproducing amplifier output, the level comparator 20 or 21 can make the selection with which the respective periods (t2 to t3), (t3 to t4), (t4 to t5) and (sum of t1 to t2 and t5 to t6) become equal, as shown in FIGS. 10 to 12. In this case, there is a merit that an image changing point on the reproducing screen is fixed at the same point, thereby providing an image which is easy to see. Such selection can be realized by making a control so that the duty ratio of the output of the level comparator 20 or 21 takes 50%.

Figure 13:
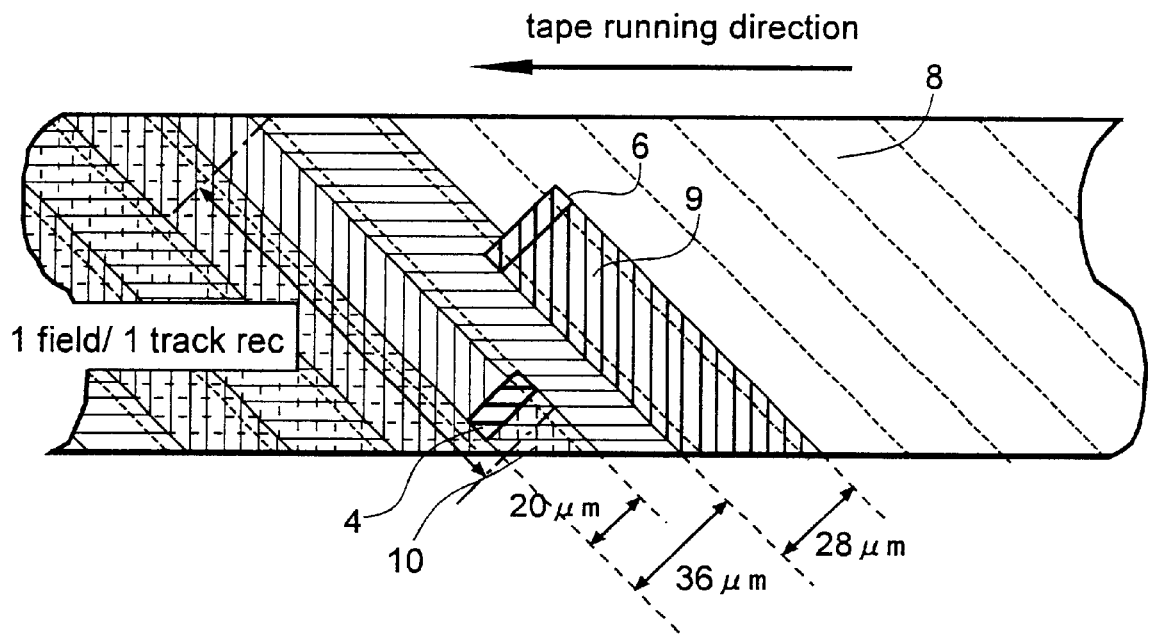
FIG. 13 is a recording pattern diagram in a triple play mode using the head construction according to the present invention.

Next, the operation at the time of recording/reproduction in a triple play mode will be described referring to FIG. 13 in connection with a relative positional relationship between the magnetic tape 8 and the heads 4 and 6. In FIG. 13, the same portions or components as those in FIGS. 1 to 12 are denoted by the same reference numerals as those used in FIGS. 1 to 12. The tape speed is controlled so that each track pitch is about 20 μm. The head width of the audio head 6 is on the order of about 28 μm with which an audio track 9 is formed on the magnetic tape 8, as mentioned above. Delayed behind the audio head 6 by 120 degree on the rotary drum 1, the sextuple play video head 4 forms a video track 10 in such a manner that it is overwritten on the audio track 9. Since the delay of 120 degree on the rotary drum 1 corresponds to the running of the magnetic tape equal to (120 degree)/(180 degree) of the track pitch (about 20 μm), the sextuple play video head 4 scans a position corresponding to a value (about 36 μm) obtained by subtracting the tape running of about 13 μm (=20 μm×120/180) from the level difference (about 49 μm) between the heads 4 and 6. Thereby, the overlapping of the same azimuth polarity portions of the audio track 9 and the video track 10 spans about 16 μm. Also, the head width of the video head 4 is about 20 μm or ensures the track pitch width of about 20 μm, it is possible to perform the recording for all track pitches with a guard band being not generated. At the time of reproduction too, the reproduction can be performed with a substantially similar relation being kept.

Figure 14:
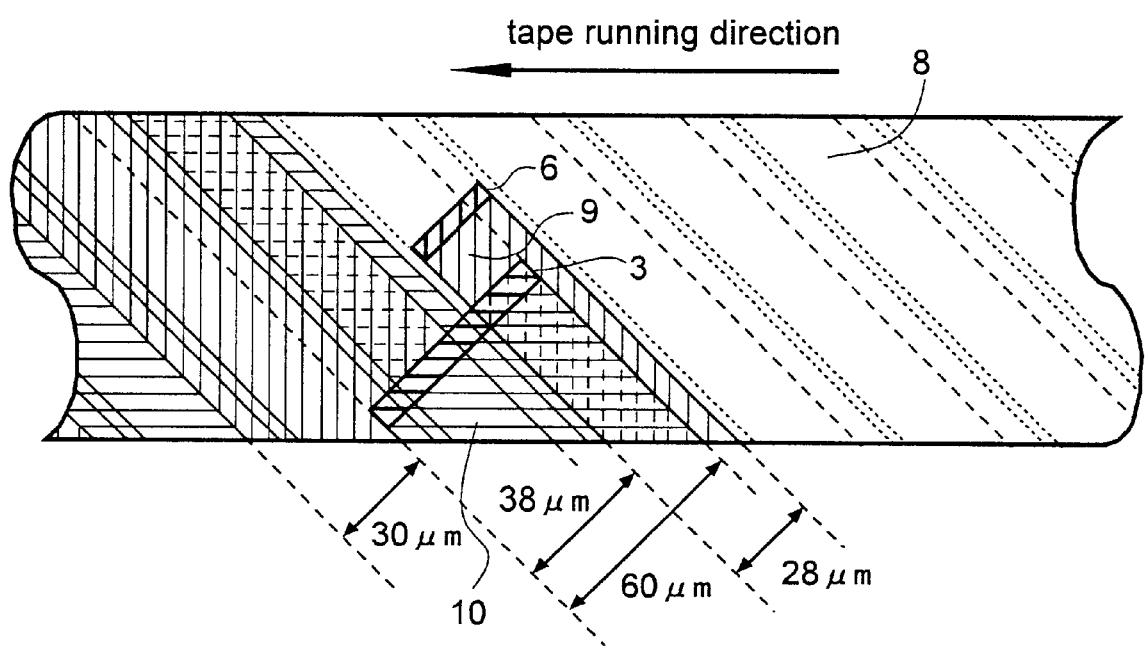
FIG. 14 is a recording pattern diagram in a double play mode using the head construction according to the present invention.

Next, the operation at the time of recording/reproduction in a double play mode will be described using FIG. 14 in connection with a relative positional relationship between the magnetic tape 8 and the heads 3 and 6. In FIG. 14, the same portions or components as those in FIGS. 1 to 13 are denoted by the same reference numerals as those used in FIGS. 1 to 13. The tape speed is controlled so that each track pitch is about 30 μm. The head width of the audio head 6 is on the order of about 28 μm with which an audio track 9 is formed on the magnetic tape 8, as mentioned above. Delayed behind the audio head 6 by 120 degree on the rotary drum 1, the standard play video head 3 forms a video track 10 in such a manner that it is overwritten on the audio track 9. Since the delay of 120 degree on the rotary drum 1 corresponds to the running of the magnetic tape equal to (120 degree)/(180 degree) of the track pitch (about 30 μm), the standard play video head 3 scans a position corresponding to a value (about 38 μm) obtained by subtracting the tape running of about 20 μm (=30 μm×120/180) from the level difference (about 58 μm) between the heads 3 and 6. Thereby, the overlapping of the same azimuth polarity portions of the audio track 9 and the video track 10 spans about 22 μm. Also, the head width of the audio head 6 is about 28 μm and hence a guard band of about 2 μm is generated for the track pitch width of about 30 μm. It is needless to say that at the time of reproduction too, the reproduction can be performed with a substantially similar relation being kept.

Thus, the recording or reproduction at the time of triple play mode can be realized by using the sextuple play video heads 4 and 5 and the recording or reproduction at the time of double play mode can be realized by using the standard play video heads 2 and 3.

Figure 15:
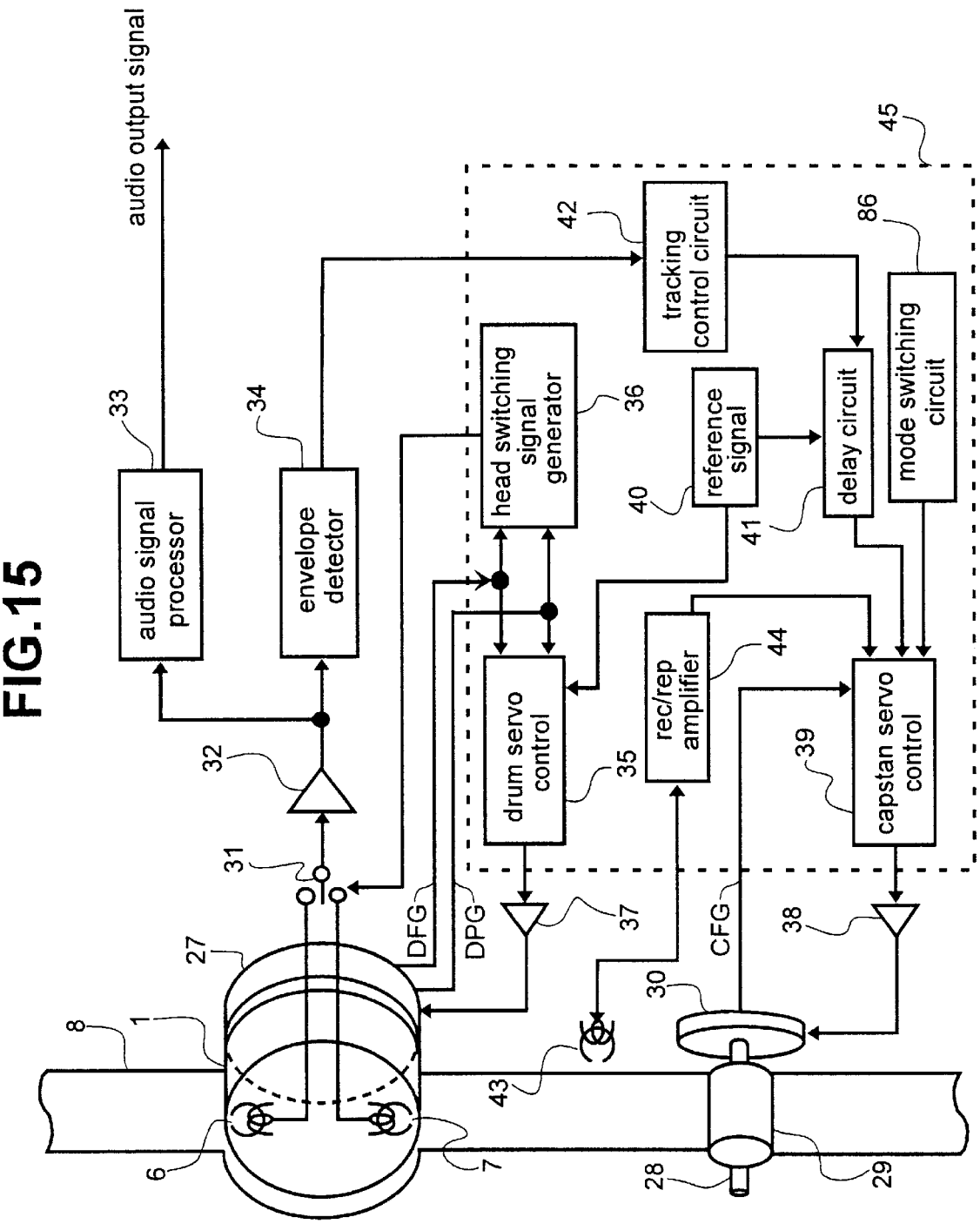
FIG. 15 is a circuit block diagram showing an embodiment of the optimum tracking method at the time of reproduction in the sextuple play mode according to the present invention.

Next, means for controlling the speed and phase of one of the tape and the head relative to the other in a magnetic recording/reproducing apparatus having various recording or reproducing modes with different tape speeds as mentioned above will now be described in detail while the tracking for reproduction at the time of sextuple play mode shown in FIG. 7 is especially taken as an example. First, the construction for tracking will be described referring to FIG. 15. In FIG. 15, the same portions or components as those in FIGS. 1 to 14 are denoted by the same reference numerals as those used in FIGS. 1 to 14. Reference numeral 27 denotes a drum motor for rotating the rotary drum 1, numeral 28 a capstan, numeral 29 a pinch roller, numeral 30 a capstan motor, numeral 31 a head switching circuit for switching signals from the audio heads 6 and 7, numeral 32 a pre-amplifier for amplifying the output signal of the head, numeral 33 an audio signal processor circuit for performing a demodulation and audio signal processing to restore a reproduction audio signal, numeral 34 an envelope detector circuit for detecting the amplitude component of an output signal of the pre-amplifier 32, numeral 35 a drum servo control circuit for controlling the speed and phase of the drum motor 27 on the basis of a drum frequency generator (DFG) signal and a drum phase generator (DPG) signal which are generated by the drum motor 27, numeral 36 a head switching signal generator circuit for generating a timing for the switching of the audio heads 6 and 7 on the basis of the DPG signal or the DFG signal normalized by the DPG signal, numerals 37 and 38 driver circuits for driving the motors, numeral 39 a capstan servo control circuit for controlling the tape running speed and phase on the basis of a CFG signal and a control signal reproduced from the tape 8, numeral 40 a reference signal generator, numeral 41 a delay circuit, numeral 42 a tracking control circuit, numeral 43 a control head, numeral 44 an amplifier for reproducing a control signal, and numeral 45 a control system for the drum and capstan of the magnetic recording/reproducing apparatus for controlling a relative positional relationship between the tape 8 and the audio heads 6 and 7.

In the above description of the construction, portions for performing electrical processings are all represented as circuits. However, a portion enclosed by dotted line 45 may be replaced by a proper microcomputer or may be constructed by software. Numeral 86 indicates a mode switching circuit between the tape speed and the drum rotating speed Next, the operation of the present embodiment will be described using FIG. 16 together with FIG. 15. A signal on a helically scanned audio track 9 recorded on the tape 8 is reproduced by the two audio heads 6 and 7 arranged on the rotary drum 1. The outputs of the audio heads 6 and 7 are alternately selected and read by the switching circuit 31. The signal is amplified by the pre-amplifier 32 and is then supplied to the audio signal processor circuit 33 and the envelope detector circuit 34. The audio signal processor circuit 33 outputs an audio signal subjected to a demodulation processing. Though not shown, the similar is made for a video signal. Namely, the video signal is reproduced by the standard play video heads 2 and 3 or the sextuple play video heads 4 and 5 arranged on the rotary drum 1. Then, a continuous reproduction signal is obtained through a switching circuit and is thereafter subjected to a demodulation processing to output a demodulation processed video signal.

On the other hand, the drum servo processing or control circuit 35 generates a control signal to keep the period of a DFG signal constant and also compares the phases of a DPG signal and an output signal of the reference signal generator 40 to perform the phase synchronization of both the signals with each other. Thereby, the speed and phase of the drum motor 27 are controlled.

Also, the capstan servo processing or control circuit 39 generates a speed control signal to keep the period of a capston frequency generator (CFG) signal constant and also compares the phase of a control signal obtained through the control head 43 and the reproducing amplifier 44 from the tape 8 and a signal obtained through the delay circuit 41 from the reference signal generator 40 to perform the phase synchronization of both the signals with each other.

Figure 16:
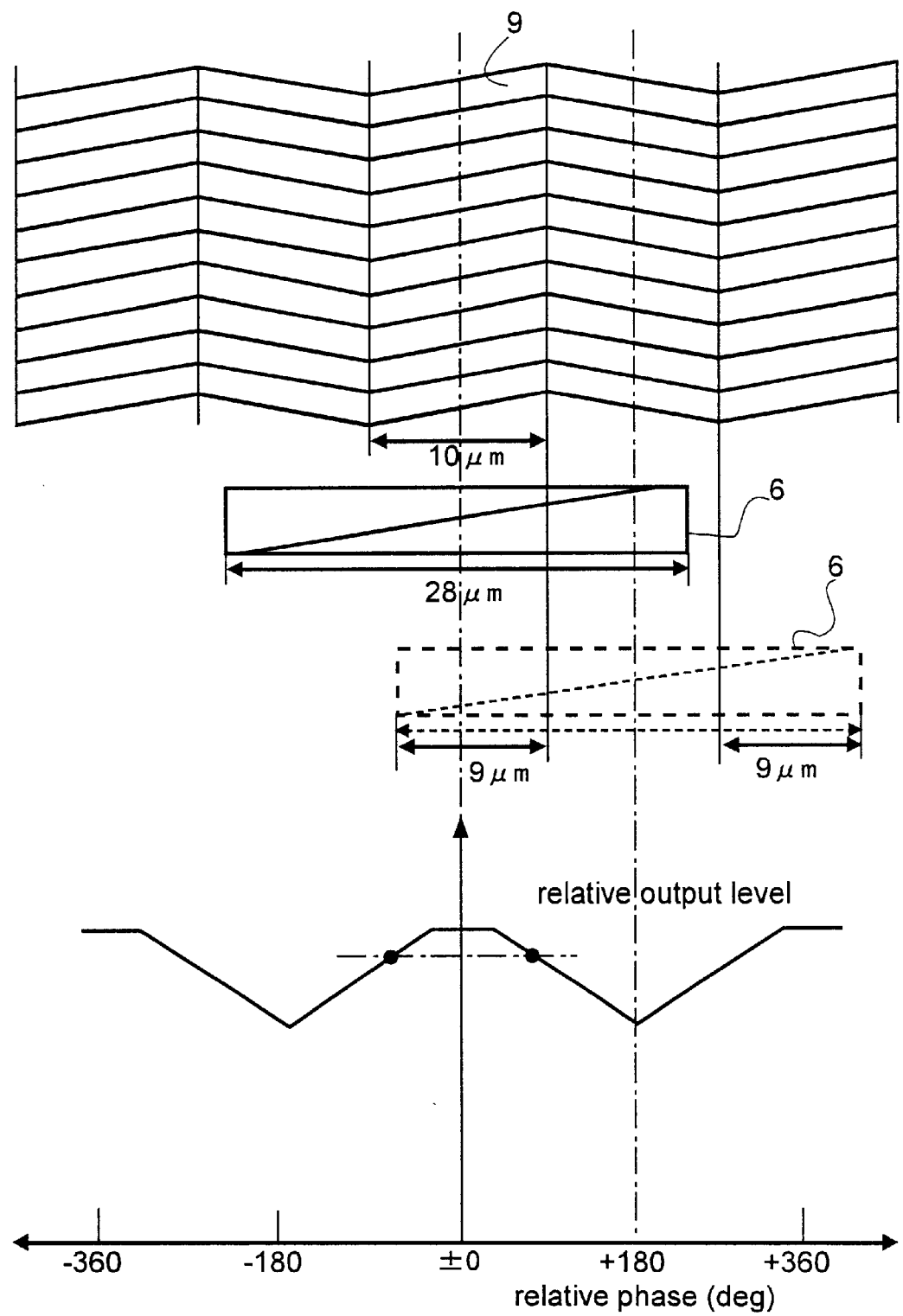
FIG. 16 is a waveform diagram showing the operation of the circuit shown in FIG. 15.

A tracking control using the capstan motor 30 is created as follows. First, the envelope detector circuit 34 detects the amplitude component of a signal read from the tape 8. An output signal of the envelope detector circuit 34 takes, for example, such a form as shown in FIG. 16, by virtue of a relative relationship between the audio track 9 formed on the tape 8 and the trace phase of the audio head 6 or 7. Namely, since the width of the audio track 9 is about 10 µm whereas the width of the audio head 6 or 7 is about 28 µm, the outputs from the nearest adjacent tracks are not substantially subjected to reproduction owing to the azimuth effect but the outputs from the nearest but one adjacent tracks are subjected to reproduction owing to the same azimuth. Therefore, when the audio head 6 or 7 traces the center of the reverse azimuth track, reproduction output levels corresponding to 9 µm are respectively detected from the same azimuth adjacent tracks on opposite sides of the reverse azimuth track (see the positional relationship of the audio head 6 indicated by dotted line in FIG. 16). However, since the same azimuth adjacent tracks have no correlation therebetween, they include signal components cancelled from each other so that the signal level of each track is lowered as compared with a signal level reproduced from the same track. Thus, a relative output level has a change, as shown in a lower portion of FIG. 16, for a change in phase of one of the audio track 9 and the audio head 6 or 7 to the other thereof. Using these results, the optimum tracking phase is set using the delay circuit 41. The optimum value can be obtained, for example, by detecting phase positions at which output levels on opposite sides become equal to each other, as shown in FIG. 16 and setting the optimum tracking phase to a center value between the detected phase positions.

Figure 24:
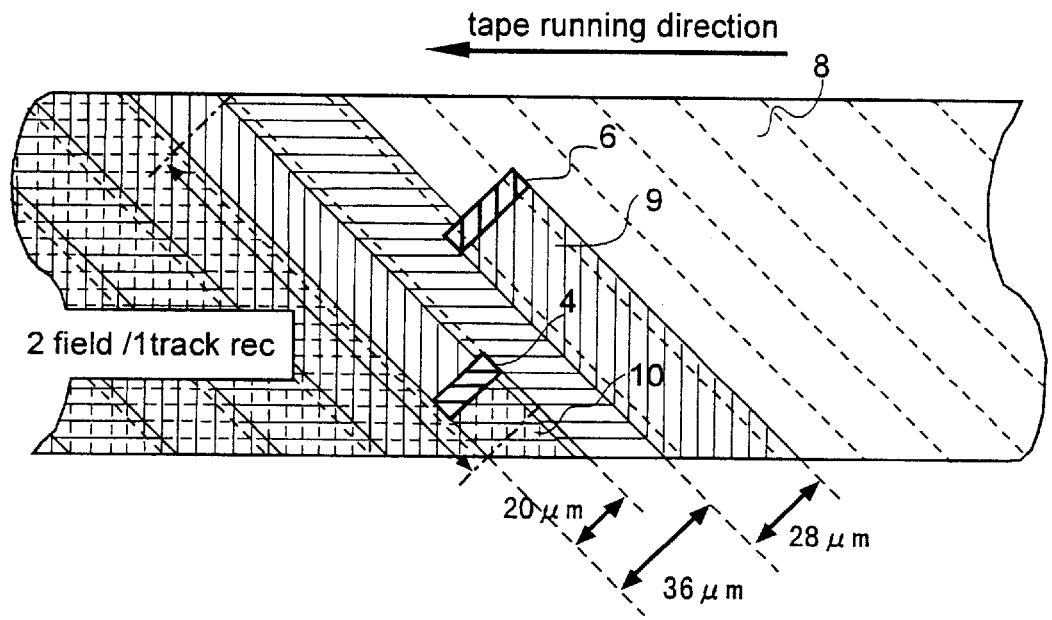
FIG. 24 is a diagram showing a relative positional relationship representing a relationship in tracking phase between a tape and heads at the time of reproduction in a sextuple play mode according to another embodiment of the present invention.
Figure 25:
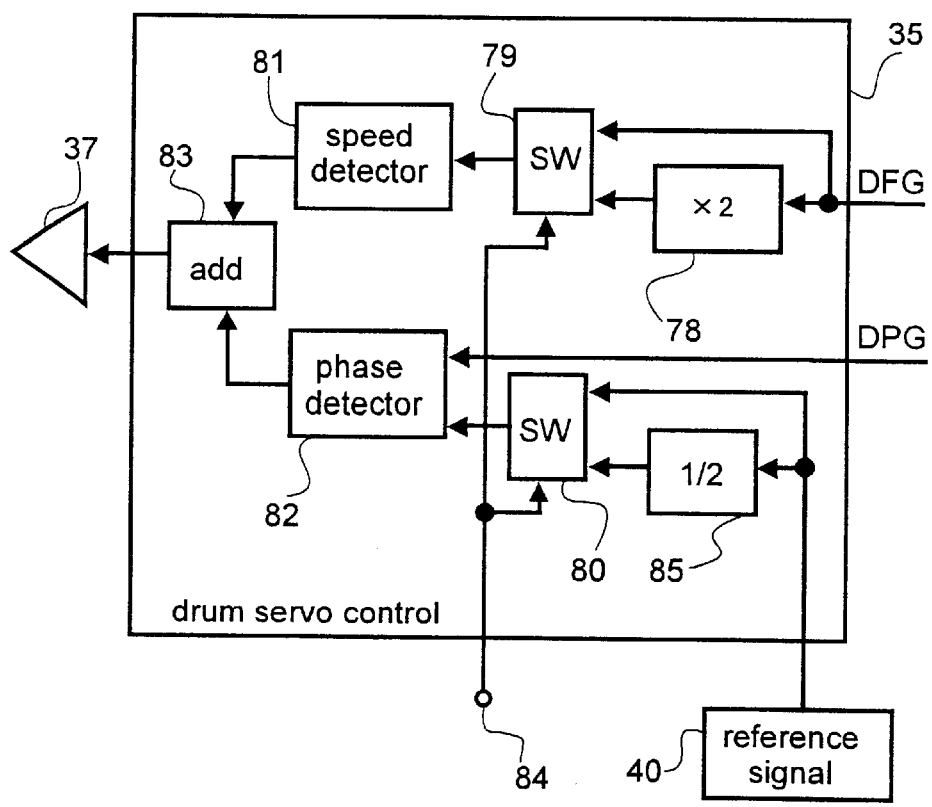
FIG. 25 is a circuit diagram showing an example of circuit means for realizing the relationship shown in FIG. 23.

Next, another embodiment of the present invention will be described referring to FIGS. 24 and 25. In the present embodiment, the description will be made of a method in which a long play recording is performed lowering not only the tape feed speed mentioned until now but also the rotating speed of the rotary head. FIG. 24 is a diagram showing a relative position relationship between a recording track on a magnetic tape and recording heads at the time of recording in the sextuple play mode in the present invention. FIG. 25 shows detailed specific circuit means in the drum servo processing or control circuit 35 shown in FIG. 15, for making the detailed description of specific circuit means which realizes the relationship shown in FIG. 24. In FIG. 25, reference numeral 78 denotes a ×2 multiplier circuit, numerals 79 and 80 switching (SW) circuits, numeral 81 a speed detector circuit, numeral 82 a phase detector circuit, numeral 83 an adder circuit, numeral 84 an input terminal for an instruction designating the sextuple play mode in the present invention, and numeral 85 a ½ demultiplier circuit.

A recording pattern shown in FIG. 24 is the same as the recording pattern in the triple play mode shown in FIG. 13. However, a recorded signal is different. Namely, in the conventional triple play mode shown in FIG. 13, one track is recorded with a video signal corresponding to one field. On the other hand, in the present embodiment, one track is recorded with a video signal corresponding to two fields so that a double amount of information is recorded. This system is realized by setting the running speed of the magnetic tape to the sextuple play mode while setting the rotating speed of the rotary head to ½. With this construction, it is possible to generate a recording track pattern free of interfering signals from the nearest adjacent tracks and the nearest but one adjacent tracks at the time of reproduction mentioned above. Of course, since the relative speed between the magnetic tape and the rotary head is lowered, it is required that attention should be directed to the deterioration of the high frequency component of a frequency modulated video signal. However, a sufficient performance is obtained if the recording/reproduction in a normal mode is made using the recent magnetic tape and head which can realize a high resolution mode (corresponding to an S-VHS mode in the case of the VHS system). Therefore, it is preferable that the recording mode in the present embodiment is limited to, for example, a mode which can be set only in the case where the S-VHS cassette tape is inserted.

Next, specific means for realizing the present method will be described in detail by use of FIGS. 15 and 25. Since the control of the magnetic tape in the sextuple mode has already been described by use of FIG. 15, specific circuit means for controlling the speed of the rotary head into ½ will now be described by use of FIG. 25. FIG. 25 shows a circuit construction provided in the drum servo control circuit 35 which controls the rotation of the rotary head. In the present long play (or sextuple play) mode contrasted with a normal mode, the switching circuits 79 and 80 operates in accordance with an instruction from the input terminal 84 so that a DFG signal generated by the rotating speed of the drum having the rotary head is supplied to the ×2 multiplier circuit 78 so that a double frequency is provided. The double frequency is supplied through the switching circuit 79 to the speed detector circuit 81 and further to the adder circuit 83 to control the drum motor. As a result, therefore, the rotary head is controlled at a speed which is ½ as compared with that in the normal mode. As to the phase detector circuit 82, a signal from the reference signal generator circuit 40 is subjected to ½ frequency division by the ½ demultiplier circuit 85 and is then supplied through the switching circuit 80 to the phase detector circuit 82 which is also inputted with a drum rotation phase signal DPG. Thus, the ½ speed control can be performed similarly for the phase control too.

Also, it is easy to realize a construction in which though not shown, the type of a magnetic tape being inserted at present is detected by a system controller so that a signal inputted to the input terminal 84 can set the above-mentioned long play recording mode, for example, only in the case where an S-VHS tape is used.

Though the recording of two fields on one track has been described in conjunction with the present embodiment. However, as can easily be understood, it is possible to construct a system in which three or more fields are recorded on one track.

Figure 17:
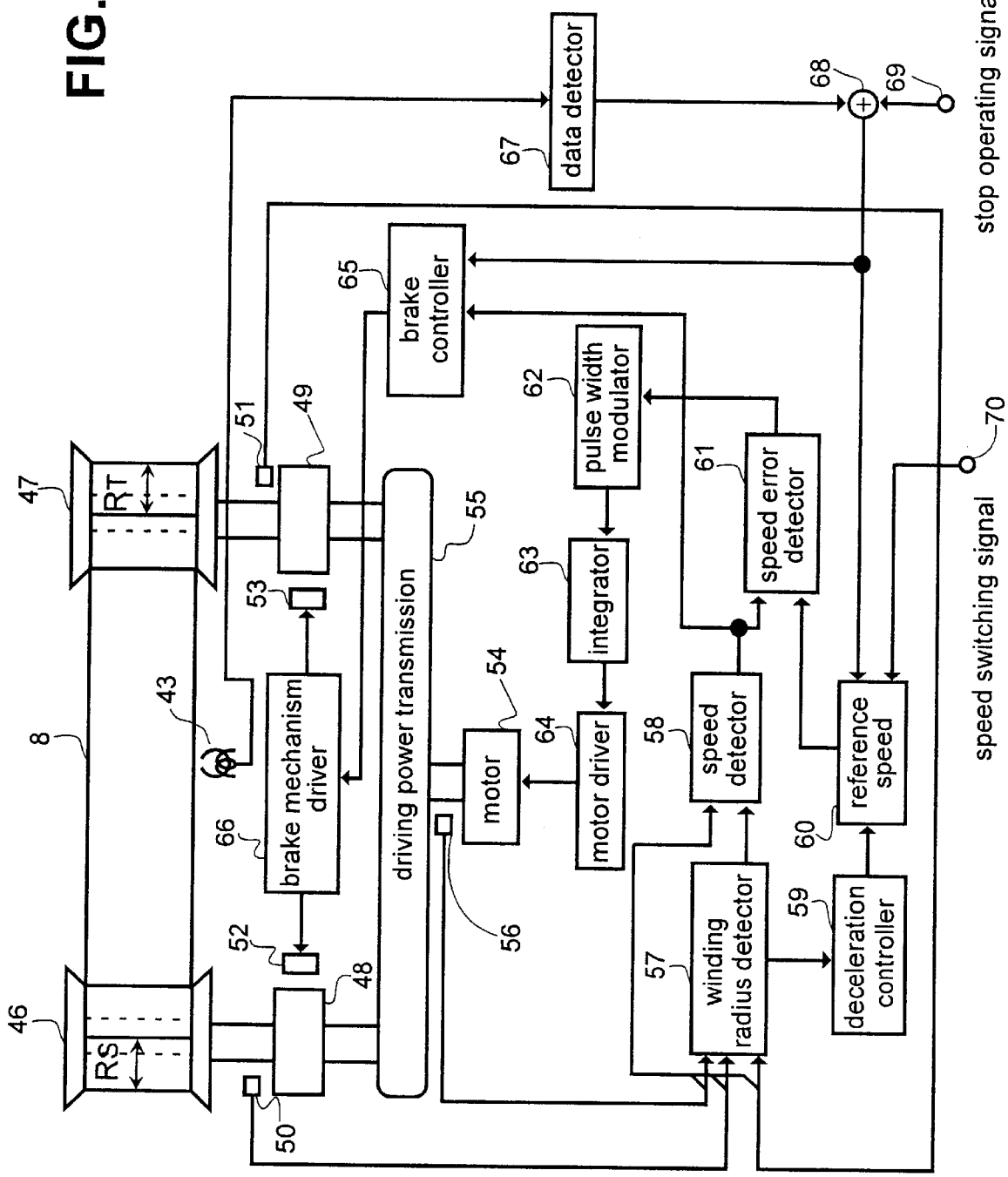
FIG. 17 is a circuit diagram showing an embodiment of sextuple mode high-speed fast feed/rewind control means according to the present invention.

Next, a high-speed fast feed/rewind operation for a magnetic tape 8 in the present invention will be described in detail by use of a block diagram shown in FIG. 17. In FIG. 17, the same portions or components as those in FIGS. 1 to 16 are denoted by the same reference numerals those used in FIGS. 1 to 16. In FIG. 17, reference numerals 46 and 47 denote reel, numerals 48 and 49 reel stands, numeral 50 a generator for generating FG (Frequency Generator) pulses obtained in proportion to the rotating speed of the reel stand 48, numeral 51 a generator for generating FG pulses obtained in proportion to the rotating speed of the reel stand 49, numerals 52 and 53 brakes, numeral 54 a motor, numeral 55 a driving power transmission unit for transmitting a rotational driving power of the motor 54 to the reel stand 48 or 49, numeral 56 a generator for generating FG pulses obtained in proportion to the rotating speed of the motor 54, numeral 57 a winding radius detector, numeral 58 a speed detector, numeral 59 a deceleration setting unit or deceleration controller, numeral 60 a target or reference speed switching unit, numeral 61 a speed error detector, numeral 62 a PWM generator or pulse width modulator, numeral 63 an integrator, numeral 64 a motor driver, numeral 65 a brake controller, numeral 66 a brake mechanism driver, numeral 67 a data detector, numeral 68 an adder, and numerals 69 and 70 input terminals.

Though the rotary drum 1 and the capstan 28 are not shown in FIG. 17, they are provided adjoining the magnetic tape 8 transferred between the reels 46 and 47. The following description referring to FIG. 17 will be made in conjunction with the fast feed/rewind operation in which the magnetic tape 8 is transferred between the reels 46 and 47 at a high speed. First, the description will be made of the operation in the case where the magnetic tape 8 runs at a speed of Vn.

The motor 54 is rotationally driven by an output signal from the motor driver 64. A driving power of the motor 54 is transmitted through the driving power transmission unit 55 to the reel stand 49 at the time of fast feed and the reel stand 48 at the time of rewind. Thereby, the magnetic tape 8 is wound on the reel 47 at the time of fast feed and the reel 46 at the time of rewind. At this time, the speeds of the reel stand 48, the reel stand 49 and the motor 54 are detected by the FG oscillators 50, 51 and 56, respectively. Frequencies indicating the detected rotating speeds of the reel stands 48 and 49 and the motor 54 are inputted to the winding radius detector 57 and the speed detector 58.

The winding detector 57 detects the winding radius Rs or Rt of the reel 46 or 47, for example, in accordance with the following equation (1):

$$Rs = (S/(\pi(1+(Tt/Ts)^2)))^{1/2}$$
$$Rt = (S/(\pi(1+(Ts/Tt)^2)))^{1/2} \quad (1)$$

wherein S is the total winding area of the tape inclusive of the reel hub when the tape is seen from above, and Ts and Tt are the periods of frequencies obtained from the FG oscillators 50 and 51.

Also, the speed detector 58 detects the running speed V of the tape, for example, in accordance with the following equation (2):

$$V = 2\pi \cdot Rt/Tt. \quad (2)$$

The radius Rs or Rt detected by the winding radius detector 57 is inputted to the speed detector 58 and the deceleration controller 59. Also, the speed data V detected by the speed detector 58 is inputted to the speed error detector 61 and the brake controller 65.

In the deceleration controller 59, a deceleration d causing no tape looseness at the time of deceleration is set on the basis of the winding radius value Rs or Rt inputted from the winding radius detector 57. In order to perform a deceleration run having no tape looseness, it is required that the deceleration d of the tape winding reel subjected to control should be set to a value not larger than a deceleration caused by a load torque of the tape supplying reel subjected to no control. Namely, the deceleration d [mm/s²] is set in accordance with the following equation (3):

$$a \leq T \cdot R/I \quad (3)$$

wherein T, R and I are the load torque [gr/mm], winding radius [mm] and moment of inertia [gr/mm²] of the tape supplying reel, respectively. It is necessary that the load torque T and the moment of inertia I are determined beforehand by measurement or the like. The tape supplying reel is the reel 46 at the time of fast feed and the reel 47 at the time of rewind.

The deceleration d set by the deceleration controller 59 is inputted to the reference speed switching unit 60. In the reference speed switching unit 60, a reference or target speed Vn is set by a speed switching signal inputted through the input terminal 70. The set reference speed Vn is inputted to the speed error detector 61. The speed error detector 61 determines an error component between the speed data V detected by the speed detector 58 and the reference speed Vn set by the reference speed switching means 60. The speed error component determined by the speed error detector 61 is fed back to the motor 54 through the PWM generator 62, the integrator 63 and the motor driver 64 so that the tape running speed V follows the reference speed Vn.

At the time of such high-speed fast feed/rewind, there is an operation in which an index signal or VISS (VHS Index Search System) signal recorded, for example, on a control signal by means of duty ratio modulation is detected from the magnetic tape 8 to stop the running of the magnetic tape 8. In FIG. 17, the index signal super-imposed on the control signal on the magnetic tape 8 is detected by the data detector 67 through the control head 43. An output of the data detector 67 is inputted to the reference speed switching unit 60 and the brake controller 65 through the adder 68. The reference speed switching unit 60 inputted with this stop operating signal starts the subtraction from the reference speed Vn. The amount of subtraction for the reference speed Vn per unit time is proportional to the deceleration d inputted from the deceleration controller 59. Thereby, the reference speed Vn changes with a gradient corresponding to the deceleration d. Since the running speed V follows the reference speed Vn, the running speed V is decelerated at the deceleration d. On the other hand, the brake controller 65 inputted with the stop operating signal judges whether or not the speed data V inputted from the speed detector 58 becomes smaller than an allowable speed VL and outputs a brake acceptance signal when V becomes smaller than VL. The brake acceptance signal outputted from the brake controller 65 is inputted to the brake mechanism driver 66. The brake mechanism driver 66 drives the brakes 52 and 53 in accordance with the brake acceptance signal from the brake controller 65 to stop the running of the tape.

Accordingly, if the reference speed Vn outputted from the reference speed switching unit 60 is a speed VH which is above the allowable speed VL, a brake acceptance signal is outputted from the brake controller 65 after the deceleration from the speed VH to the speed VL subsequent to the input of a stop operating signal, thereby stopping the running. Since the deceleration changes as the winding radius of the supplying reel changes, the timing of brake is different for each winding radius.

Also, if the reference speed Vn is lower than the allowable speed VL, a stop operation is such that the brake controller 65 outputs a brake acceptance signal simultaneously with the input of a stop operating signal to stop the running.

By using a construction in which the output of the reference speed switching unit 60 is switched in accordance with which one of modes from the standard play mode to the sextuple play mode the magnetic tape 8 is recorded in, the convenience of use by purposes can be improved. Namely, in the case of designating a mode in which the magnetic tape 8 is to be merely rewound up to its head portion, the setting to the most fast rewinding speed suffices irrespective of the recording mode. However, at the time of fast feed/rewind in a mode in which the running of the tape is stopped in accordance with the detection of an index signal superimposed on a control signal, as mentioned above, the frequency of a control signal reproduced from a magnetic tape 8 is such that even at the same tape speed, a frequency detected from a magnetic tape subjected to recording in a sextuple play mode is six times as high as that detected from a magnetic subjected to recording in a standard play mode. In this case, there may be considered a possibility that the frequency of a reproduction control signal becomes too high for the control signal to be detected. The reproduction control signal is used as information for managing a tape position by virtue of the number of signals. Therefore, if the detection of the reproduction control signal is not possible, there results in a defective system. Also, even if the number of reproduction control signals can be detected, the system is defective if an index signal super-imposed on the reproduction control signal cannot be detected. For such circumstances, means for limiting a high-speed fast feed/rewind speed at the time of sextuple mode is provided. This high-speed fast feed or rewind speed is set by supplying a speed switching signal to the reference speed switching unit 60 from the input terminal 70. Thereby, even for a tape subjected to recording in the newly provided sextuple play mode, it is possible to realize, even in the high-speed fast feed/rewind mode, a search control in which an index signal super-imposed on a control signal on the tape is detected to stop the tape at a desired position.

Also, the judgement of a recording mode at the time of reproduction can be made through the comparison of a normally reproduced control signal frequency and the speed of a magnetic tape.

The input terminal 69 is provided for inputting a stop operating signal when an operator performs a stop operation manually.

The motor 54 in the foregoing description may be the same as the capstan motor 30 shown in FIG. 15.

In a recording/reproducing apparatus and a reproducing apparatus according to the present invention as mentioned above, the recording/reproduction of an audio signal in both a standard play mode and a long play mode or N-ple play mode (N: an integer not smaller than 4) can be realized by a common audio head in regard to the recording or reproduction of a video signal and an audio signal. Also, an N-ple play mode video head can be used in common for realizing the recording/reproduction of a video signal in a triple play mode. Further, a standard play mode video head can be used in common for realizing the recording/reproduction of a video signal in a double play mode.

With a construction in which an audio head output is used as a tracking method at the time of reproduction in the N-ple play mode, it is possible to perform the optimum tracking for both audio and video. Also, with a construction in which at the time of completion of recording in the N-ple play mode, a video signal is supplied with a time prolonged corresponding to the delay of scan of a video head from that of an audio head, it is possible to surely overwrite a video track on an audio track. Further, with a construction in which a high-speed fast feed/rewind speed at the time of N-ple play mode is set to a low value as compared with the tape speed at the time of standard play mode, the detection of an index signal from the tape in the N-ple play mode can be ensured.

While we have shown and described several embodiments in accordance with our invention, it should be understood that disclosed embodiments are susceptible of changes and modifications without departing from scope of the invention. Therefore, we do not intend to be bound by the details shown and described herein but intend to cover all such changes and modifications falling within the ambit of the appended claims.

We claim:

1. A recording/reproducing apparatus of a helical scan system for recording a video signal and an audio signal in a superimposed manner on a magnetic tape by use of magnetic head means mounted on a rotary body or reproducing such recorded signals by use of the magnetic head means, wherein said magnetic head means includes first and second video heads for recording or reproducing a video signal at the time of standard play mode in which the running speed of the magnetic tape is a standard speed, third and fourth video heads for recording or reproducing a video signal at the time of N-ple play mode in which the tape running speed is approximately 1/N of said standard speed, N being an integer not smaller than 4, and first and second audio heads for recording or reproducing an audio signal, said video and audio heads being provided on the outer periphery of said rotary body, said first and second video heads, said third and fourth video heads, and said first and second audio heads are respectively provided in pairs so that the heads in each pair are arranged at positions which are substantially symmetrical with respect to a rotation axis of said rotary body, the gap planes of the paired heads being tilted relative to a plane perpendicular to a head rotation direction by equal angles in different directions, and the tilt angles of said first and second audio heads being different from the tilt angles of said first and second video heads and said third and fourth video heads, and the recording is performed so that said first and second video heads or said third and fourth video heads record a video signal in a superimposed manner on a track having an audio signal recorded on said magnetic tape by said first and second audio heads.

2. A recording/reproducing apparatus according to claim 1, wherein the head width of each of said first and second audio heads is smaller than three times as large as a track pitch formed on the magnetic tape at the time of N-ple play mode.

3. A recording/reproducing apparatus according to claim 2, wherein there is provided tracking control means for performing a tracking control by use of a signal reproduced by said first and second audio heads when a magnetic tape subjected to recording in said N-ple play mode is reproduced.

4. A recording/reproducing apparatus according to claim 1, wherein the head width of each of said third and fourth video heads is approximately two times as large as a track pitch formed on the magnetic tape at the time of N-ple play mode.

5. A recording/reproducing apparatus according to claim 1, wherein the heights of arrangement of said third and fourth video heads and said first and second audio heads relative to a reference surface of said rotary body are set to positions with which at the time of N-ple play mode, said third and fourth video heads scan said magnetic tape in a manner delayed from said first and second audio heads by four or more tracks.

6. A recording/reproducing apparatus according to claim 5, wherein at the time of completion of recording, the stop of supply of an audio recording signal to said first and second audio heads is followed by the supply of a video recording signal to said third and fourth video heads with a time prolonged corresponding to the delay of scan of the magnetic tape by said third and fourth video heads from that by said first and second audio heads.

7. A recording/reproducing apparatus according to claim 1, wherein the value of N is 5.

8. A recording/reproducing apparatus according to claim 1, wherein the value of N is 6.

9. A recording/reproducing apparatus according to claim 1, wherein the value of N is set by arbitrarily selecting an integer not smaller than 4 from among a plurality of values.

10. A recording/reproducing apparatus according to claim 1, wherein the recording/reproducing apparatus is a video tape recorder based on a VHS system.

11. A recording/reproducing apparatus according to claim 1, wherein the running speed of said magnetic tape or recording medium and the rotating speed of said rotary body can be set or selected in accordance with the result of detecting the type of said magnetic tape or recording medium.

12. A recording/reproducing apparatus according to claim 1, wherein when the type of the used magnetic tape is an S-VHS tape, a mode having the value of N not smaller than 4 can be set or selected.

13. A recording/reproducing apparatus of a helical scan system for recording a video signal and an audio signal in a super-imposed manner on a magnetic tape by use of magnetic head means mounted on a rotary body or reproducing such recorded signals by use of the magnetic head means, wherein said magnetic head means includes first and second video heads for recording or reproducing a video signal at the time of standard play mode in which the running speed of the magnetic tape is a standard speed, third and fourth video heads for recording or reproducing a video signal at the time of N-ple play mode in which the tape running speed is approximately 1/N of said standard speed, N being an integer not smaller than 4, and first and second audio heads for recording or reproducing an audio signal, said video and audio heads being provided on the outer periphery of said rotary body, said first and second video heads, said third and fourth video heads, and said first and second audio heads are respectively provided in pairs so that the heads in each pair are arranged at positions which are substantially symmetrical with respect to a rotation axis of said rotary body, the gap planes of the paired heads being tilted relative to a plane perpendicular to a head rotation direction by equal angles in different directions, and the tilt angles of said first and second audio heads being different from the tilt angles of said first and second video heads and said third and fourth video heads, said first and fourth video heads having their gap planes with different titling directions are arranged in proximity to each other to form one pair while said second and third video heads having their gap planes with different titling directions are arranged in proximity to each other to form one pair, these pairs being respectively arranged rearward of the arranging positions of said first and second audio heads by approximately 120 degree along the head rotation direction so that the heights of the centers of the head widths of these video heads measured from a reference surface of said rotary body substantially coincide with each other, and the recording is performed so that said first and second video heads or said third and fourth video heads record a video signal in a super-imposed manner on a track having an audio signal recorded on said magnetic tape by said first and second audio heads.

14. A recording/reproducing apparatus of a helical scan system for recording a video signal and an audio signal in a super-imposed manner on a magnetic tape by use of magnetic head means mounted on a rotary body or reproducing such recorded signals by use of the magnetic head means, wherein said magnetic head means includes first and second video heads for recording or reproducing a video signal at the time of standard play mode in which the running speed of the magnetic tape is a standard speed, third and fourth video heads for recording or reproducing a video signal at the time of triple play mode in which the tape running speed is approximately 1/3 of said standard speed, and first and second audio heads for recording or reproducing an audio signal, said video and audio heads being provided on the outer periphery of said rotary body, said first and second video heads, said third and fourth video heads, and said first and second audio heads are respectively provided in pairs so that the heads in each pair are arranged at positions which are substantially symmetrical with respect to a rotation axis of said rotary body, the gap planes of the paired heads being tilted relative to a plane perpendicular to a head rotation direction by equal angles in different directions, and the tilt angles of said first and second audio heads being different from the tilt angles of said first and second video heads and said third and fourth video heads, the recording is performed so that said first and second video heads or said third and fourth video heads record a video signal in a super-imposed manner on a track having an audio signal recorded on said magnetic tape by said first and second audio heads, and at the time of N-ple play mode in which the tape running speed is approximately 1/N of said standard speed wherein N is an integer not smaller than 4, the recording is performed so that said third and fourth video heads record a video signal in a superimposed manner on a track having an audio signal recorded on said magnetic tape by said first and second audio heads.

15. A recording/reproducing apparatus according to claim 14, wherein the head width of each of said third and fourth video heads recording or reproducing a video signal at the time of triple play mode and at the time of N-ple play mode is substantially equal to a track pitch at the time of triple play mode.

16. A recording/reproducing apparatus according to claim 14, wherein the value of N is 5.

17. A recording/reproducing apparatus according to claim 14, wherein the value of N is 6.

18. A recording/reproducing apparatus according to claim 14, wherein the recording/reproducing apparatus is a video tape recorder based on a VHS system.

19. A recording/reproducing apparatus according to claim 14, wherein the running speed of said magnetic tape or recording medium and the rotating speed of said rotary body can be set or selected in accordance with the result of detecting the type of said magnetic tape or recording medium.

20. A reproducing apparatus of a helical scan system for reproducing a video signal and an audio signal by use of magnetic head means mounted on a rotary body, said video signal and said audio signal being recorded in a superimposed manner on a magnetic tape, wherein said magnetic head means includes first, second, third and fourth video heads and first and second audio heads, there is provided means for making the switching between a standard play reproducing mode for causing said first and second video heads and said first and second audio heads to reproduce a video signal and an audio signal recorded in a standard play mode in which the running speed of the magnetic tape is a standard speed, a triple play reproducing mode for causing said third and fourth video heads and said first and second audio heads to reproduce a video signal and an audio signal recorded in a triple play mode in which the tape running speed is approximately 1/3 of said standard speed, and a N-ple play reproducing mode for causing said third and fourth video heads and said first and second audio heads to reproduce a video signal and an audio signal recorded in an N-ple play mode in which the tape running speed is approximately 1/N said standard speed, N being an integer not smaller than 4, said first and second video heads, said third and fourth video heads, and said first and second audio heads are respectively provided in pairs so that the heads in each pair are arranged at positions which are substantially symmetrical with respect to a rotation axis of said rotary body, the gap planes of the paired heads being tilted relative to a plane perpendicular to a head rotation direction by equal angles in different directions, and the tilt angles of said first and second audio heads being different from the tilt angles of said first and second video heads and said third and fourth video heads, and preceding said first and second video heads or said third and fourth video heads, said first and second audio heads reproduce the signal recorded on said magnetic tape.

21. A reproducing apparatus according to claim 20, wherein the value of N is 5.

22. A reproducing apparatus according to claim 20, wherein the value of N is 6.

23. A reproducing apparatus according to claim 20, wherein the value of N is set by arbitrarily selecting an integer not smaller than 4 from among a plurality of values.

24. A reproducing apparatus according to claim 20, wherein the recording/reproducing apparatus is a video tape recorder based on a VHS system.

25. A reproducing apparatus of a helical scan system for reproducing a video signal and an audio signal by use of magnetic head means mounted on a rotary body, said video signal and said audio signal being recorded in a superimposed manner on a magnetic tape, wherein said magnetic head means includes first, second, third and fourth video heads and first and second audio heads, there is provided means for making the switching between a standard play reproducing mode for causing said first and second video heads and said first and second audio heads to reproduce a video signal and an audio signal recorded in a standard play mode in which the running speed of the magnetic tape is a standard speed, a double play reproducing mode for causing said first and second video heads and said first and second audio heads to reproduce a video signal and an audio signal recorded in a double play mode in which the tape running speed is approximately 1/2 of said standard speed, a triple play reproducing mode for causing said third and fourth video heads and said first and second audio heads to reproduce a video signal and an audio signal recorded in a triple play mode in which the tape running speed is approximately 1/3 of said standard speed, and a N-ple play reproducing mode for causing said third and fourth video heads and said first and second audio heads to reproduce a video signal and an audio signal recorded in an N-ple play mode in which the tape running speed is approximately 1/N of said standard speed, N being an integer not smaller than 4, said first and second video heads, said third and fourth video heads, and said first and second audio heads are respectively provided in pairs so that the heads in each pair are arranged at positions which are substantially symmetrical with respect to a rotation axis of said rotary body, the gap planes of the paired heads being tilted relative to a plane perpendicular to a head rotation direction by equal angles in different directions, and the tilt angles of said first and second audio heads being different from the tilt angles of said first and second video heads and said third and fourth video heads, and preceding said first and second video heads or said third and fourth video heads, said first and second audio heads reproduce a signal recorded on said magnetic tape.

26. A recording/reproducing apparatus of a helical scan system for recording or reproducing a video signal on or from a magnetic tape by use of magnetic head means mounted on a rotary body, wherein said magnetic head means includes first, second, third and fourth video heads, and there is provided means for making the switching between a first recording mode in which a video signal is recorded by said first and second video heads at a standard track pitch, a second recording mode in which a video signal is recorded by said third and fourth video heads at a track pitch equal to approximately 1/3 of said standard track pitch, and a third recording mode in which a video signal is recorded by said third and fourth video heads at a track pitch equal to approximately 1/N of said standard track pitch, N being an integer not smaller than 4.

27. A reproducing apparatus of a helical scan system for reproducing a video signal and an audio signal by use of magnetic head means mounted on a rotary body, said video signal and said audio signal being recorded in a superimposed manner on a magnetic tape, wherein said magnetic head means includes first, second, third and fourth video heads and first and second audio heads, there is provided means for making the switching between a first reproducing mode in which said video signal and said audio signal recorded at a standard track pitch are respectively reproduced by said first and second video heads and said first and second audio heads, a second reproducing mode in which said video signal and said audio signal recorded at a track pitch equal to approximately 1/3 of said standard track pitch are respectively reproduced by said third and fourth video heads and said first and second audio heads, and a third reproducing mode in which said video signal and said audio signal recorded at a track pitch equal to approximately 1/N of said standard track pitch are respectively reproduced by said third and fourth video heads and said first and second audio heads, N being an integer not smaller than 4, and preceding said first and second video heads or said third and fourth video heads, said first and second audio heads reproduce said signal recorded on said magnetic tape.

28. A recording/reproducing apparatus of a helical scan system for recording or reproducing a video signal on or from a recording medium by use of magnetic head means mounted on a rotary body, comprising:

first and second video heads as said magnetic head means for alternately forming recording tracks on said recording medium;

delay means for delaying at least one of video recording signals supplied to said first and second video heads;

delay control means for controlling a delay time of said delay means substantially for each recording track, said delay control means making a control so that horizontal synchronizing signals recorded on said recording medium are arranged between adjacent recording tracks; and means for making the switching between a standard play recording mode in which the recording is performed while delay times for the video recording signals supplied to said first and second video heads are set by said delay control means so as to be equal to each other and a long play recording mode in which the recording is performed while said delay times are set by said delay control means so as to be variable.

29. A recording/reproducing apparatus of a helical scan system for recording or reproducing a signal on or from a recording medium by use of a magnetic head mounted on a rotary body, comprising means for making the switching between a first recording/reproducing mode in which the recording/reproducing is performed with said recording medium being run at a first running speed and with said rotary body being rotated at a first rotating speed, a second recording/reproducing mode in which the recording/reproducing is performed with said recording medium being run at a second running speed and with said rotary body being rotated at said first rotating speed, and a third recording/reproducing mode in which the recording/reproducing is performed with said recording medium being run at a third running speed and with said rotary body being rotated at a second rotating speed.

30. A recording/reproducing apparatus according to claim 29, wherein said second running speed is 1/N of said first running speed, N being an integer not smaller than 2, said third running speed is 1/M of said second running speed, M being an integer not smaller than 2, and said second rotating speed is 1/M of said first rotating speed, M being an integer not smaller than 2.

31. A recording/reproducing apparatus according to claim 30, wherein when the type of the used magnetic tape is an S-VHS tape, said third recording/reproducing mode can be set or selected.

\* \* \* \* \*